（12）United States Patent
Yamamoto et al.

(10) Patent No.: US 9,855,664 B2
(45) Date of Patent: Jan. 2, 2018

(54) ROBOT SAFETY SYSTEM

(71) Applicant: DENSO WAVE INCORPORATED, Chita-gun, Aichi-pref. (JP)

(72) Inventors: Tomoya Yamamoto, Chita-gun (JP); Daisuke Kawase, Chita-gun (JP); Toshifumi Enomoto, Chita-gun (JP); Masakazu Utsunomiya, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 15/358,925

(22) Filed: Nov. 22, 2016

(65) Prior Publication Data

US 2017/0210017 A1    Jul. 27, 2017

(30) Foreign Application Priority Data

Nov. 25, 2015  (JP) .................................. 2015-229604
Nov. 30, 2015  (JP) .................................. 2015-233296

(51) Int. Cl.
  *B25J 19/06*    (2006.01)
  *B25J 9/16*     (2006.01)
  *B25J 13/08*    (2006.01)

(52) U.S. Cl.
  CPC ............ *B25J 19/06* (2013.01); *B25J 9/1674* (2013.01); *B25J 9/1676* (2013.01); *B25J 9/1697* (2013.01); *B25J 13/088* (2013.01); *G05B 2219/39082* (2013.01); *G05B 2219/40202* (2013.01); *Y10S 901/49* (2013.01)

(58) Field of Classification Search
  CPC ........ B25J 13/088; B25J 19/06; B25J 9/1676; B25J 9/1697; G05B 2219/39082; G06B 2219/40202; Y10S 901/49
  See application file for complete search history.

(56) References Cited

U.S. PATENT DOCUMENTS

| 2010/0164990 A1* | 7/2010 | Van Doorn | .......... G02B 27/017 345/633 |
| 2015/0209961 A1 | 7/2015 | Komatsu et al. | |
| 2016/0171770 A1* | 6/2016 | Pedrotti | ............... G02B 27/017 345/633 |

FOREIGN PATENT DOCUMENTS

JP    2014-095903 A    5/2014

* cited by examiner

*Primary Examiner* — Edward Park
(74) *Attorney, Agent, or Firm* — Oliff PLC

(57) ABSTRACT

In a robot safety system, a safety controller specifies a robot that a worker is looking at based on position of worker and/or visual field of worker, and acquires distance between robot and worker based on position information. Safety controller generates a fence image of which display mode is changed depending on distance to robot, which is a virtual image showing a boundary position of an operating range of robot, based on acquired distance. Generated fence image is displayed on a glasses type display device that the working is wearing such that fence image overlaps visual field of worker. In another example of the robot safety system, a virtual fence may be displayed on a head mount type display device as a fence image, and display mode of fence image may be optimized such that work efficiency of worker is affected as little as possible.

16 Claims, 13 Drawing Sheets

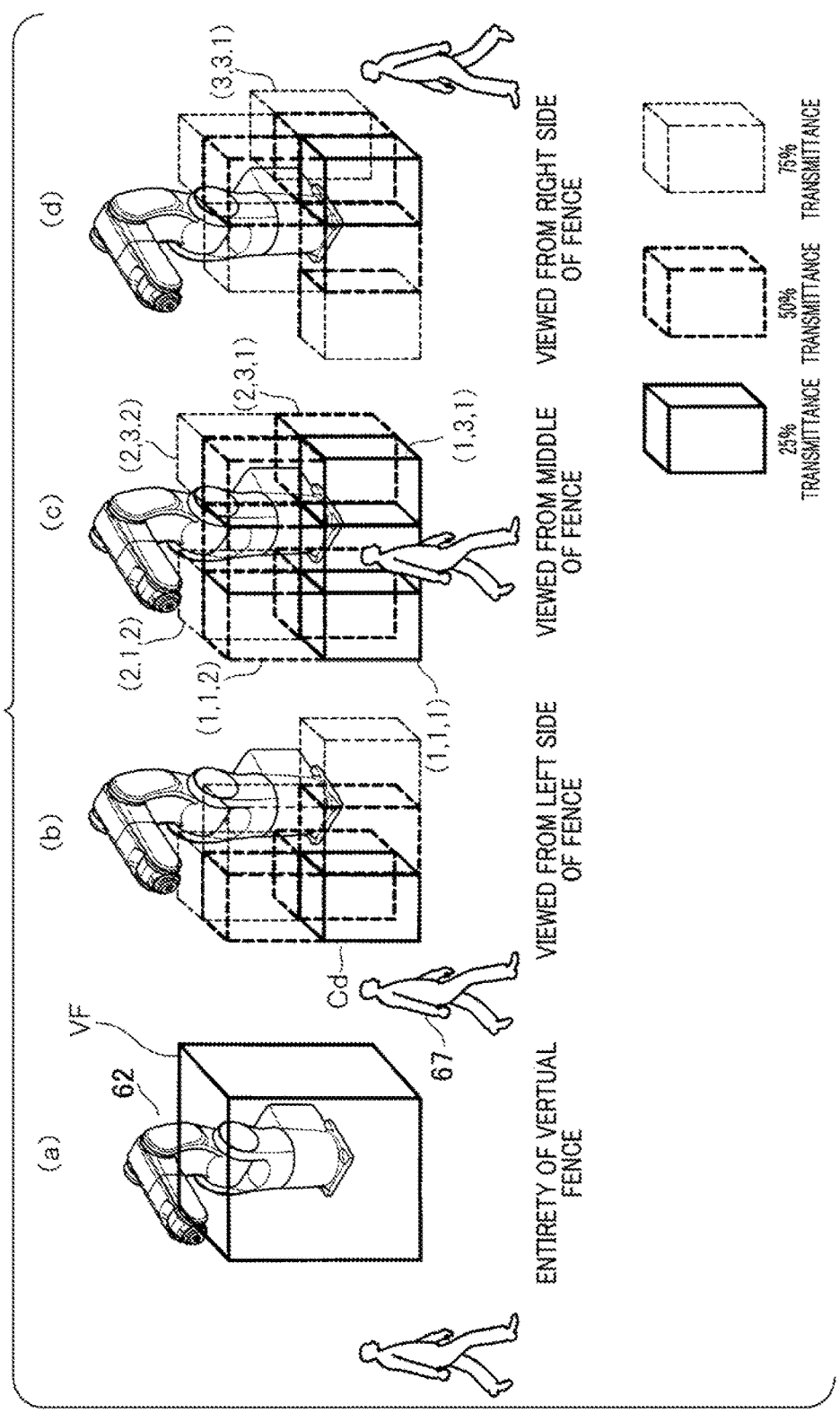

ROBOT SAFETY SYSTEM

CROSS-REFERENCE TO RELATED APPLICATION

This application is based on and claims the benefit of priority from earlier Japanese Patent Applications No. 2015-229604 filed on Nov. 25, 2015 and No. 2015-233296 filed on Nov. 30, 2015 the descriptions of which are incorporated herein by reference.

BACKGROUND

Technical Field

The present invention relates to a robot safety system that secures safety at the time of working in a place in which a robot, such as an industrial robot, is installed.

Related Art

Conventionally, in the case in which an industrial robot is installed, a physical fence for regulating the entry into an operating range of the robot is frequently provided. In recent years, however, the case in which the physical fence is not provided has been increased as the result of compactification of a factory. In this case, when a worker enters the operating range, the worker may contact the robot. For this reason, a safety measure for preventing contact between the robot and the worker is presented, for example, in Patent Document 1.

In addition, a technology of displaying, for example, images and various kinds of information about virtual reality using a head mount type display device, which is configured to project an image on a display unit mounted to the head of a worker, is proposed, for example, in Patent Document 2. This technology is used to secure the safety of the worker who may enter an operating region of the robot.

As one example, in the case in which the worker sees the robot through the head mount type display device, it is considered that an image of a virtual safety fence is displayed around the robot. Hereinafter, the "virtual safety fence" will be referred to as a "virtual fence." In the case in which such a system is introduced, the safety of the worker is secured, and it is not necessary to dispose a real safety fence. Consequently, it is possible to improve the work efficiency of the worker in an environment in which the robot and the worker coexist.

RELATED ART DOCUMENT

Patent Document

[Patent Document 1] Japanese Patent Application Publication No. 2015-157352
[Patent Document 1] Japanese Patent Application Publication No. 2014-95903

However, it is considered that, when the worker does not contact the robot, highest safety is achieved.

On the other hand, if the virtual fence is displayed on the head mount type display device whenever the robot enters the visual field of the worker, the attention of the worker is distracted, with the result that the work efficiency of the worker is reduced.

SUMMARY

The present invention has been made in view of the above problems, and it is a first object of the present invention to provide a robot safety system that is capable of securing the safety of a worker at the time of working in a place in which a physical fence is not provided and of reducing a possibility of the worker entering an operating range of the robot.

In addition, it is a second object of the present invention to provide a virtual fence display system that is capable of optimizing the display mode of a virtual fence displayed on a head mount type display device such that the work efficiency of the worker is affected as little as possible.

In order to achieve the first object, therefore, a robot safety system, such as an industrial robot safety system, according to a first embodiment of the present invention will be described.

First, in the case in which a virtual fence image is displayed in the state of overlapping the visual field of a worker, it is necessary to determine a display mode in which the worker can easily see the virtual fence image and the worker is kept safe.

It is not possible for a virtual fence image displayed on a transmission type display device, such as a head mount type display device, to physically regulate the entry into an operating range, unlike a conventional real fence. In addition, in recent years, it has been considered that it is also possible to display a realistic image that looks like a real object and that it is possible to show the boundary position of the operating range simply by displaying a realistic fence image. However, it is difficult to obtain mental suppression effects to regulate approach to that place. On the other hand, the head mount type display device has a merit in that the head mount type display device can display a virtual image that is different from reality.

Therefore, it is considered to obtain mental suppression effects to regulate approach to the operating range utilizing the merits of the virtual image. On the other hand, in the case in which too much information is presented or a complicated presentation method is used, it may take time to determine information, and therefore rapid response may not be possible.

According to a first embodiment of the present invention, the robot safety system includes a position information acquisition unit for acquiring position information capable of specifying the position of a worker, a visual field information acquisition unit for acquiring visual field information capable of specifying the visual field of the worker, a specification unit for specifying a robot that the worker is looking at based on the position of the worker and/or the visual field of the worker, a distance acquisition unit for acquiring the distance between the robot and the worker based on the position information, a fence image generation unit for generating a fence image of which the display mode is changed depending on the distance to the robot, which is a virtual image showing a boundary position of an operating range of the robot, based on the acquired distance, and a head mount type display device mounted to the worker for displaying the generated fence image such that the fence image overlaps the visual field of the worker.

According to the above structure, the fence image showing the boundary position of the operating range of the robot, i.e. the fence-shaped image, is displayed within the visual field of the work. If the mental state of the worker is normal, it is considered that the worker should not enter the fence in the case in which the fence is provided.

In addition, the display mode of the fence image is changed depending on the distance to the robot, whereby it is possible for the worker to intuitively determine whether he/she is close to or far from the robot, i.e., whether he/she is at a safe position or a dangerous position.

Consequently, it is possible to secure the safety of the worker and to reduce a possibility of the worker entering the operating range of the robot.

In a preferred example of the first embodiment, the fence image generation unit generates a fence image having a mode in which the transmittance of the fence image is reduced as the distance to the robot is reduced. In order to prevent the worker from approaching the robot, it is considered that the worker should not advance closer to the robot than the current position. In this case, it is considered that the worker should not advance mentally by intercepting information about the direction toward the robot. The reason for this is that, in the case in which everything before the worker is black, which is an extreme example, it is considered that the worker will hesitate to advance further. On the other hand, in a mode in which the visual field of the worker 9, who is moving in, for example, a factory, is abruptly blocked, the worker may be rather in danger.

In the case in which the fence image is generated in a mode in which the transmittance of the fence image is reduced as the distance to the robot is reduced, the worker cannot see what is ahead or it is hard for the worker to see what is ahead as the worker approaches the robot, whereby the worker will hesitate to move in that direction, i.e. toward the robot. Consequently, it is possible to reduce a possibility of the worker entering the operating range of the robot.

At this time, since transmittance is reduced as the distance to the robot is reduced, it is possible to eliminate a possibility of the visual field of the worker being abruptly blocked in the vicinity of the robot, whereby it is possible to secure the safety of the worker during the movement of the worker.

In another preferred example of the first embodiment, the fence image generation unit generates a fence image having a mode in which the display size of the fence image is increased as the distance to the robot is reduced. In the case in which the display size of the fence image is increased, as described above, it is possible to clearly present the worker that the advance in that direction is forbidden, whereby it is possible to reduce a possibility of the worker entering the operating range of the robot.

In another preferred example of the first embodiment, the fence image generation unit generates a fence image having a mode in which the color of the fence image is changed depending on the distance to the robot. In daily life, danger may be classified and presented using colors. For example, at a traffic light, blue indicates the permission of entry, yellow indicates stop, and red indicates the prohibition of entry. Consequently, it is possible to intuitively present danger in an easy-to-understand mode.

In another preferred example of the first embodiment, the fence image generation unit generates a fence image having a mode in which the percentage of the fence image with respect to the visual field of the worker is within a predetermined range irrespective of the distance to the robot. Even in the case in which the entry into the operating range R of the robot is restrained by displaying the fence image, if the visual field of the worker is blocked by the displayed fence image, the worker may be rather in danger. For this reason, the fence image is generated such that the percentage of the fence image with respect to the visual field of the worker is uniform, i.e. a fixed amount of the visual field of the worker is secured, to improve safety during movement. In addition, rapid response is not disturbed even in the case in which the worker is near the robot.

In another preferred example of the first embodiment, the fence image generation unit generates a fence image having a mode in which the fence image avoids a display regulation range that is preset on the basis of the center of the visual field of the worker. Consequently, it is possible to secure a fixed amount of the visual field of the worker, whereby it is possible to improve safety during movement. In addition, rapid response is not disturbed even in the case in which the worker is near the robot.

In a further preferred example of the first embodiment, the fence image generation unit generates a fence image having a mode in which the display mode of the fence image is changed in stages based on the movement locus of the worker until the robot enters the visual field of the worker. Specifically, the fence image generation unit generates a fence image having a mode in which the fence image is changed in stages from a display mode at the time at which the distance to the robot is long to a display mode at a current position in the case in which the worker moves in the direction in which the worker approaches the robot. On the other hand, the fence image generation unit generates a fence image having a mode in which the fence image is changed in stages from a display mode at the time at which the worker is near the robot to a display mode at the current position in the case in which the worker moves in the direction in which the worker becomes far away from the robot.

For example, in the case in which, when the worker turns around in the state in which the worker is near the robot and works while facing a direction different from the direction that facing the robot, the robot enters the visual field of the worker, with the result that a fence image is abruptly displayed, it is not possible to understand the meaning of the presented fence image. Consequently, it is possible for the worker to easily perceive that the presented image is a fence image for regulating the entry into the moving range and whether the worker moves toward the robot or away from the robot by changing the display mode of the fence image in stages based on the movement locus of the worker until the robot enters the visual field of the worker. In the case in which the worker moves toward the robot, the worker can move in the direction in which the worker becomes distanced from the robot in order to avoid danger.

On the other hand, in order to achieve the second object of the present invention, a robot safety system, such as an industrial robot safety system, is provided as a virtual fence display system in accordance with a second embodiment. According to this system, an image processing unit stores 3D model image data obtained by three-dimensionally modeling a safety fence disposed around a robot main body based on the position of the robot main body as a center, i.e. 3D model image data of a virtual fence. In addition, the image processing unit processes the 3D model image data of the virtual fence such that the 3D model image data of the virtual fence are divided into a plurality of rectangular parallelepipeds and each of the rectangular parallelepipeds is displayed as an image having a predetermined transmittance. Here, the term" rectangular parallelepipeds" also includes "cubes."

When the information about the position and the direction of the worker, who is wearing a head mount type display device, is acquired, the image processing unit processes the 3D model image data of the virtual fence displayed on a display unit such that the 3D model image data are projected into the visual field of the worker. In this case, the image processing unit processes the 3D model image data depending on the relationship in position and direction between the virtual fence and the worker such that the transmittance of those among the rectangular parallelepipeds that are close to the worker is low and the transmittance of those among the rectangular parallelepipeds that are far from the worker is high and transmits the processed 3D model image data of the virtual fence to the head mount type display device. Upon receiving the processed 3D model image data of the virtual fence, the head mount type display device projects the 3D model image data on the display unit.

According to the above structure, the image of the entirety of the virtual fence is not always disposed on the head mount type display device, but the transmittance of those among the rectangular parallelepipeds that are relatively close to the worker is decreased such that the worker can easily be aware of the presence of the virtual fence. On the other hand, the transmittance of those among the rectangular parallelepipeds that are relatively far from the worker is increased such that the worker is not made aware of the presence of the virtual fence.

Consequently, it is possible to secure the safety of the worker by displaying the virtual fence even in the case in which an actual safety fence is not disposed around the robot arm and to improve the work efficiency of the worker in a region in which the worker works with the robot. In addition, since the transmittance of portions of the virtual fence that are relatively far from the worker, at which the safety of the worker is sufficiently secured, is increased, it is possible to prevent the attention of the worker from being distracted. Furthermore, since the worker can easily visually recognize the robot main body and the actual view around the robot main body, it is possible to improve work efficiency.

According to a preferred example of the second embodiment, the position and direction information acquisition unit includes an imaging device disposed in the head mount type display device and the image processing unit for acquiring the information about the position and the direction of the worker from an image of the robot main body contained in image data captured by the imaging device.

It is easy to dispose a small-sized imaging device at the head mount type display device, and it is possible to perceive the direction and the size of the robot main body that is extracted from image data captured by the imaging device through the visual field of the worker. Consequently, it is possible for the image processing unit to acquire information about the position and direction of the worker by processing the image data, and therefore it is not necessary to use a separate sensor for acquiring the information.

According to another preferred example of the second embodiment, the image processing unit changes the transmittance of the 3D model image data in stages. Here, the term "stages" means stages that are greater than the minimum resolution at least at the time at which the image processing unit changes the transmittance and at which the worker can recognize the change of the transmittance. According to the above structure, it is possible to reduce the calculation amount of the image processing unit and to more clearly recognize the boundary at which the transmittance of the rectangular parallelepipeds is changed with respect to the worker.

BRIEF DESCRIPTION OF THE DRAWINGS

In the drawings:

FIG. 14 is a view three-dimensionally showing an example of setting the transmittance of each rectangular parallelepiped.

DETAILED DESCRIPTION OF THE PREFERRED EMBODIMENTS (First Embodiment)

Hereinafter, a first embodiment of the present invention will be described with reference to FIGS. 1 to 7.

Figure 1:
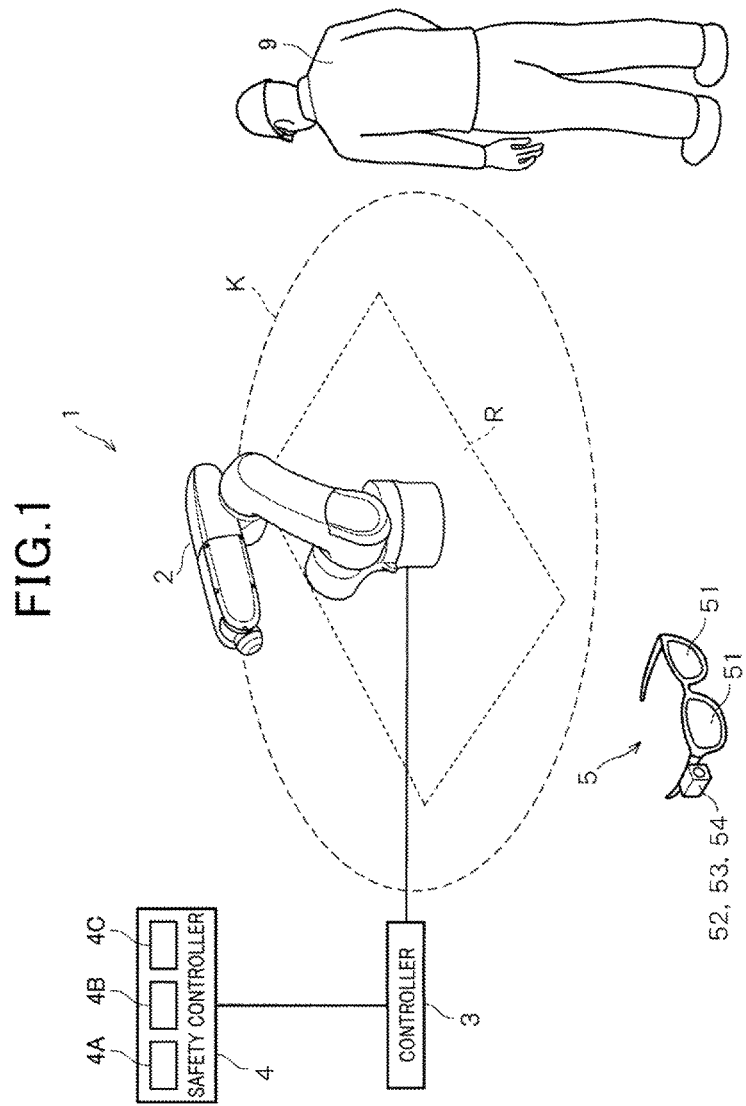
FIG. 1 is a view schematically showing the work environment of a robot safety system according to a first embodiment.

As shown in FIG. 1, a robot safety system 1 according to this embodiment includes a robot 2 (also referred to as a robot arm or a robot main body), a robot controller 3, a safety controller 4, and a glasses type display device 5 mounted to the head of a worker 9 (head mount type display device). The glasses type display device 5 is a wearable device that is used in the state of being mounted to the head as if glasses are worn. The glasses type display device 5 is also called smart glasses or cyber glasses.

In this embodiment, it is assumed that the worker 9 (a user, i.e. a person) works in the vicinity of the robot 2 or through the vicinity of the robot 2 in the state in which a physical fence for regulating the entry into an operating range R of the robot 2 is not provided. In this case, the operating range R is set to be less than a range in which an arm of the robot 2 is capable of physically reaching, to put it more plainly, a movable range K, which indicates a range in which the arm of the robot 2 is capable of reaching when the arm of the robot 2 is fully extended.

In this case, it is assumed that the worker 9 teaches the robot 2 (i.e. the robot arm (or the robot main body) or removes a workpiece that has been processed by the robot 2, as an example of work. In addition, the case in which the worker 9 passes the vicinity of the robot 2 merely to move is also assumed. In this embodiment, a range in which the robot 2 is operated when the robot 2 does actual work, more strictly speaking, a space in which the arm or a tool is moved when the robot 2 is operated, is called the operating range R. Furthermore, the operating range R is set even on the side of the robot 2. Consequently, the robot 2 is controlled so as not to exceed the operating range R.

In this embodiment, it is assumed that a so-called vertical articulated robot is used as the robot 2. Although a detailed description of the robot 2 will be omitted since the construction of the robot 2 is normal, the robot 2 has six axis arms that are driven by motors, and a tool is used in the state of being mounted to the tip of the sixth axis arm. However, the robot 2 is not limited thereto, but may be a horizontal articulated robot, a linear motion type robot, a self-traveling robot, a human-type robot, or a combination thereof.

Figure 2:
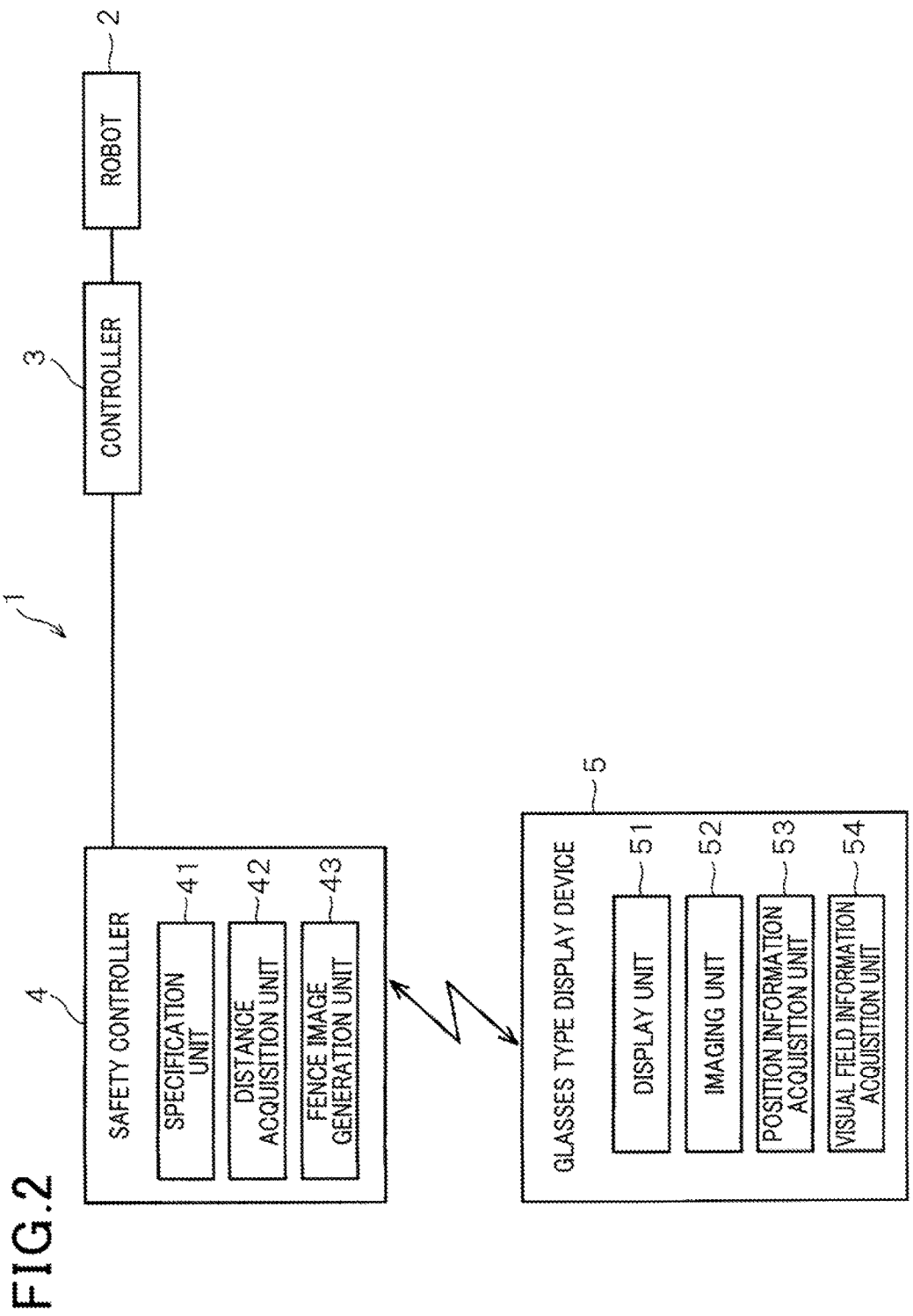
FIG. 2 is a view schematically showing the electrical construction of the robot safety system.
Figure 3:
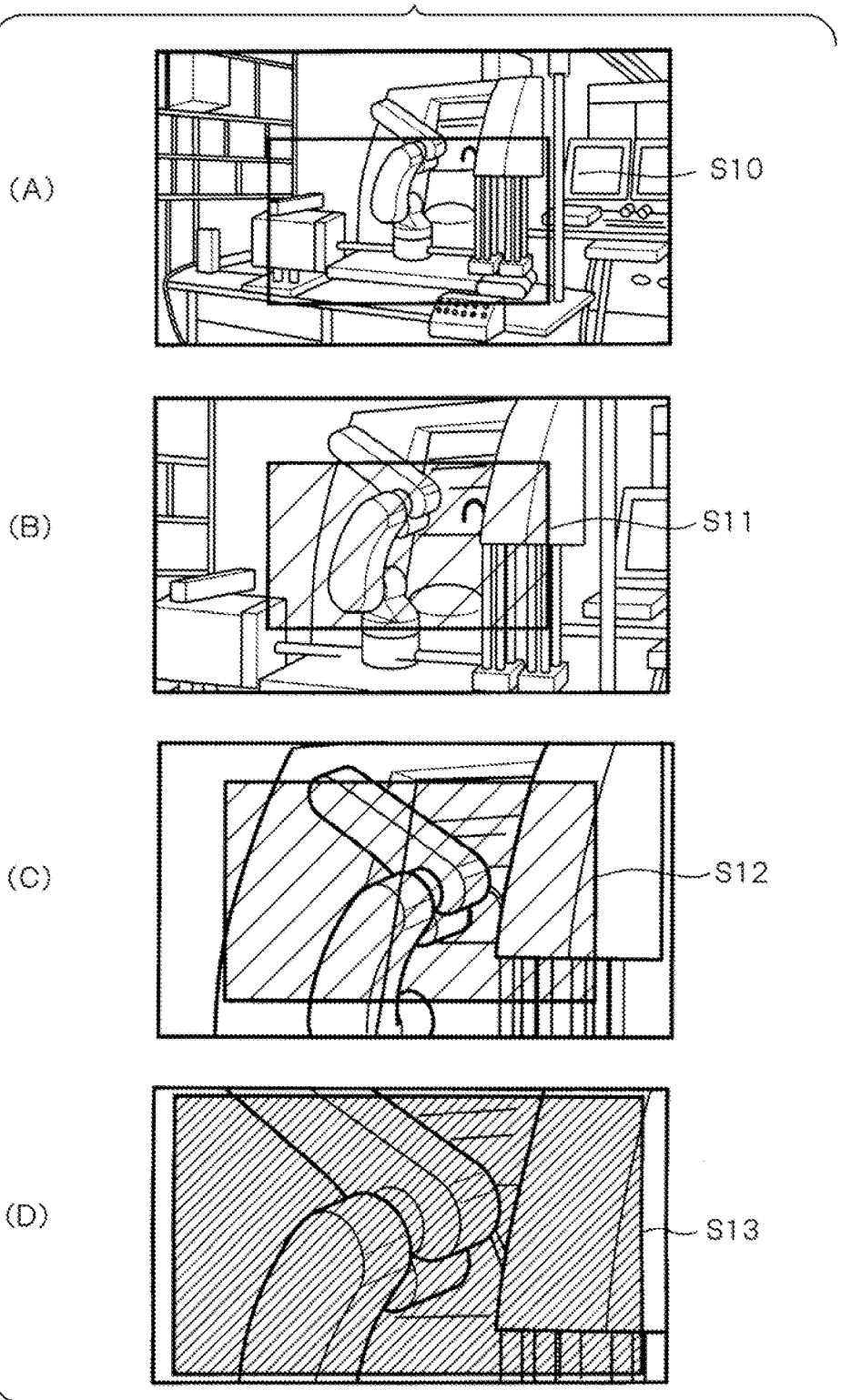
FIG. 3 is a view schematically showing an example of the display mode of a fence image (part 1)

As shown even in FIG. 2, the robot 2 is connected to the robot controller 3, which controls the operation of the robot, i.e. motors of the axes. Furthermore, since the robot controller 3 uses well-known structures, in other words, because no special structures are needed for the robot 2 and the robot controller 3 in this embodiment, a detailed description thereof will be omitted.

The glasses type display device 5 is formed in a shape in which the worker 9 can wear the glasses type display device on the head in the same manner as general glasses, and therefore it is possible to display an image on a transparent display unit 51, which corresponds to lenses. For this reason, the image displayed on the glasses type display device 5 may overlap a visual field of the worker 9. In other words, the worker 9 may view an actual scene with his/her own eyes and, at the same time, may view a virtual image displayed on the glasses type display device 5. Such a glasses type display device 5 is also called a transmission type display device. Furthermore, the glasses type display device 5 is also referred to as smart glasses shown in FIG. 10, a description of which will follow.

In this embodiment, the glasses type display device 5 includes an imaging unit 52, a position information acquisition unit 53, and a visual field information acquisition unit 54. In this embodiment, as shown in FIG. 1, the imaging unit 52, the position information acquisition unit 53, and the visual field information acquisition unit 54 are modularized and mounted in a frame of the glasses type display device 5. Alternatively, the imaging unit 52, the position information acquisition unit 53, and the visual field information acquisition unit 54 may not be modularized, but may be individually mounted in the frame of the glasses type display device 5.

The imaging unit 52 includes a small-sized CCD camera or CMOS camera. The imaging unit 52 is mounted in the frame of the glasses type display device 5 so as to be aligned with the facial direction of the worker 9. For this reason, an image captured by the imaging unit 52 has almost the same angle of view as the visual field of the worker 9. In other words, the imaging unit 52 images almost the same scene as that viewed by the worker 9.

The position information acquisition unit 53 includes a small-sized GPS (Global Positioning System) unit. The position information acquisition unit 53 acquires position information that is capable of specifying the position of the worker 9. Alternatively, the position information acquisition unit 53 may not be limited to the structure that directly specifies the position of the worker, like the GPS unit. For example, the position information acquisition unit 53 may be configured to acquire the movement locus of the worker 9 from a reference position, such as the entrance of a factory, and to indirectly specific the position of the worker based on displacement of the reference position.

The visual field information acquisition unit 54 acquires visual field information that is capable of specifying the visual field of the worker 9. In this embodiment, the facial direction of the worker 9, i.e. the visual field of the worker 9, is specified by measuring the direction of the glasses type display device 5 using a tri-axial acceleration sensor mounted in the glasses type display device 5 on the assumption that the visual field of the worker 9 is aligned with the facial direction of the worker 9. Alternatively, an element other than the acceleration sensor may be used as the visual field information acquisition unit 54. For example, a gyro sensor may be provided to specify the visual field of the worker from the image captured using the imaging unit 52.

The robot controller 3 and the glasses type display device 5 are connected to the safety controller 4, which is a high-level control device, so as to transmit and receive various kinds of information to and from the safety controller 4. In this case, the safety controller 4 and the glasses type display device 5 may be directly connected to each other, for example, in a wireless communication fashion. Alternatively, the safety controller 4 and the glasses type display device 5 may be indirectly connected to each other via a teaching device (not shown) possessed by the worker 9.

This safety controller 4 is provided as a computer which includes a CPU(central processing unit) 4A executing operation algorisms, a ROM(read-only memory) 4B, and a RAM (random access memory) 4C and is configured to be communicable with external systems. When being activated, the CPU 4A reads from the ROM 4B control programs and processing programs and temporarily stores such programs in the work area, and executes steps of such programs sequentially. In this embodiment, the ROM 4B functions as a non-transient computer readable recording medium. The RAM 4C is used as a temporary storage for data generated during execution of the programs of the CPU 4A.

The safety controller 4 is configured, by processing of the CPU 4A, to acquire various kinds of information capable of specifying the state of operation of the robot 2 and the control state of the robot controller 3 from the robot controller 3. Consequently, it is possible for the safety controller 4 to acquire operation information indicating the state of operation of the robot 2 and control information indicating the control state of the robot controller 3, such as the rotating angle of the arm of the robot 2 and the state of activation of the motor, in real time. In addition, the safety controller 4 also stores the coordinates of the robot 2, i,e, the installation position of the robot 2, in a two-dimensional coordinate system having a reference position, for example, in a factory, as the original point.

In addition, the safety controller 4 functionally includes a specification unit 41, a distance acquisition unit 42, and a fence image generation unit 43, which are provided by processing of the CPU 4A. More practically, in this embodiment, the specification unit 41, the distance acquisition unit 42, and the fence image generation unit 43 may be realized by software, in which given programs previously stored in the ROM 4B are executed by the CPU 4A.

The specification unit 41 specifies a robot 2 that the worker 9 is looking at, i.e. a robot 2 that is present within the visual field of the worker 9, based on the position of the worker 9 acquired by the position information acquisition unit 53 and/or the visual field of the worker 9 acquired by the visual field information acquisition unit 54. For example, in the case in which one robot 2 is present in the vicinity of the worker 9, the safety controller 4 can specify the robot 2 from the position of the worker 9 and the installation position of the robot 2. Or, in the case in which a plurality of robots 2 is present in the vicinity of the worker 9, the safety controller 4 can specify a robot 2 that the worker 9 is looking at from the position of the worker 9 and the visual field of the worker 9.

The distance acquisition unit 42 acquires the distance to the robot 2 specified by the specification unit 41, i.e. the distance to the robot 2 that the worker is looking at, based on the position information acquired by the position information acquisition unit 53.

The fence image generation unit 43 generates a fence image of which the display mode is changed depending on the distance between the worker 9 and the robot 2, which is a virtual image showing a boundary position of an operating range R of the robot, a detailed description of which will follow, based on the distance between the worker 9 and the robot 2 acquired by the distance acquisition unit 42.

Next, the operation of the above structure will be described.

First, in the case in which a virtual fence image is displayed in the state of overlapping the visual field of the worker 9, it is necessary to determine a display mode in which the worker 9 can easily see the virtual fence image and the worker 9 is kept safe.

It is not possible for a virtual fence image displayed on a transmission type display device, such as the glasses type display device 5, to physically regulate the entry into an operating range R, unlike a conventional real fence. In addition, in recent years, it has been considered that it is also possible to display a realistic image that looks like a real object and that it is possible to show the boundary position of the operating range R simply by displaying a realistic fence image. However, it is difficult to obtain mental suppression effects to regulate approach to that place. On the other hand, the glasses type display device 5 has a merit in that the glasses type display device 5 can display a virtual image that is different from reality.

In this embodiment, therefore, it is possible to obtain mental suppression effects to regulate approach to the operating range R utilizing the merits of the virtual image. Hereinafter, several methods according to this embodiment will be individually described. Furthermore, the robot safety system 1 according to this embodiment implements any of the methods or a combination of the methods.

<Method Based on Information Interception>

In order to prevent the worker from approaching the robot 2, it is considered that the worker 9 should not advance closer to the robot 2 than the current position. In this case, it is considered that the worker 9 should not advance mentally by intercepting information about the direction toward the robot 2. The reason for this is that, in the case in which everything before the worker is black, which is an extreme example, it is considered that the worker will hesitate to advance further. On the other hand, in a mode in which the visual field of the worker 9, who is moving in, for example, a factory, is abruptly blocked, the worker may be rather in danger.

In this method, therefore, the fence image generation unit 43 generates a fence image having a mode in which the transmittance of the fence image is reduced as the distance to the robot 2 is reduced, which is a fence image of which the display mode is changed depending on the distance to the robot 2. In this case, the transmittance may be reduced linearly depending on the distance. Alternatively, the transmittance may be greatly changed at the time of entering the movable range K or at the time of maximally approaching the operating range R.

Specifically, in the case in which the distance to the robot 2 is relatively long, as shown in FIG. 3(A), the fence image generation unit 43 generates a fence image S10 having only a frame, i.e. having a transmittance in the frame of 100%. At this time, the generated fence image S10 is displayed on the display unit 51 of the glasses type display device 5. In this case, the worker 9 can perceive the boundary position of the operating range R and, in addition, can perceive that he/she is present at a safe position that is relatively far away from the robot 2 based on the fact that only the frame is displayed.

When the worker 9 approaches the robot 2 in this state with the result that the distance between the worker 9 and the robot 2 is reduced, the fence image generation unit 43 generates a fence image S11 having a frame the size of which is the same as that in the fence image S10 but having a transmittance in the frame lower than that in the fence image S10, as shown in FIG. 3(B). Furthermore, in FIG. 3(B), the state in which transmittance is reduced is schematically shown by hatching. The fence image S11 is displayed on the display unit 51 of the glasses type display device 5. At this time, the transmittance is preferably not reduced to such an extent that the background cannot be seen.

In this case, the worker 9 can perceive that he/she has approached the robot 2 based on the fact that the transmittance is reduced. In addition, it is hard to see the robot as the result of reduction of the transmittance, whereby it is considered that the worker should not mentally approach that place.

When the worker 9 further approaches the robot 2 with the result that the distance between the worker 9 and the robot 2 is reduced, the fence image generation unit 43 generates a fence image S12 having a frame the size of which is greater than that in the fence image S11 and having a transmittance in the frame lower than that in the fence image S11, as shown in FIG. 3(C). Furthermore, in FIG. 3(C), the state in which transmittance is reduced is schematically shown by hatching. The fence image S12 is displayed on the display unit 51 of the glasses type display device 5.

In this case, the worker 9 can perceive that he/she has approached the robot 2 based on the fact that the transmittance is further reduced. In addition, it is hard to see the robot as the result of reduction of the transmittance, whereby it is considered that the worker should not mentally approach that place.

At this time, whether or not the size of the frame is changed may be determined based on whether or not the worker has entered, for example, the movable range K of the robot. At the time of normal work, the robot is not operated beyond the operating range R thereof, but the arm of the robot 2 may reach the worker within the movable range K. For this reason, in order to inform the worker 9 that the worker has entered the movable range K, the size of the frame maybe changed at the time of entering the movable range K.

When the worker 9 further approaches the robot 2 with the result that the distance between the worker 9 and the robot 2 is reduced right up to the operating range R, the fence image generation unit 43 generates a fence image S13 having a frame the size of which is greater than that in the fence image S12 and having a transmittance in the frame even lower than that in the fence image S12, as shown in FIG. 3(D). In this case, the transmittance may be reduced to such an extent that it is hard to see the background unless the background is carefully viewed or to such an extent that it is not possible to see the background at all. Furthermore, in FIG. 3(D), the state in which transmittance is reduced is schematically shown by hatching. The fence image S13 is displayed on the display unit 51 of the glasses type display device 5.

In this case, the worker 9 determines that further advance is dangerous based on the fact that the transmittance is further reduced to such an extent that it is hard to see the background unless the background is carefully viewed or to such an extent that it is not possible to see the background at all, and considers that he/she should not approach the robot 2.

As described above, in the method based on information interception, the fence image displayed on the glasses type display device 5 is generated in a mode in which the transmittance is reduced depending on the distance to the robot 2 in order to obtain mental suppression effects to regulate approach to the operating range R. In addition, the display size of the fence image is increased as the distance to the robot 2 is reduced. Consequently, it is possible to reduce a possibility of the worker 9 entering the operating range R even in the state in which no physical fence is present.

In addition, in the robot safety system 1 according to this embodiment, in the case in which the worker 9 has entered the operating range R even though the fence images S10 to S13 are displayed, no fence image is generated or displayed. The reason for this is that, in the case in which the worker 9 has entered the operating range R, it is assumed that it is rather dangerous to block the visual field of the worker. That is, in the robot safety system 1, a virtual fence image is configured to be displayed with respect to the worker 9 located outside the operating range R of the robot 2 than the operating range R of the robot 2. In other words, the fence image generation unit 43 generates a fence image while the worker 9 is moving to the operating range R from a distant place. In the case in which the worker 9 has entered the operating range R, however, a notification process of notifying the worker that the worker 9 has entered the operating range R is performed in a mode in which the visual field of the worker 9 is not blocked.

<Method Based on Active Information Presentation>

In order to prevent the worker 9 from approaching the robot 2, it is considered that it is possible to make the worker not advance further by actively presenting information of the robot 2, i.e. by explicitly showing that a robot 2 that may move is present. On the other hand, it is considered that it is also important to present the extent of danger to the worker 9.

In this method, therefore, the fence image generation unit 43 generates a fence image having a mode in which the display size of the fence image is increased as the distance to the robot 2 is reduced, which is an image of which the display mode is changed depending on the distance to the robot 2. Furthermore, the mode in which the display size of the fence image is increased in this method means a mode in which the shape of the fence image itself is uniform and the display range of the fence image is increased depending on the distance. More easily speaking, the above mode is a mode that is similar to a viewpoint of reality in which an object that is present far away is seen to be small and an object that is present nearby is seen to be large.

Specifically, in the case in which the distance to the robot 2 is relatively long, as shown in FIG. 4(A), the fence image generation unit 43 generates a fence image S20 having only a frame. At this time, the generated fence image S20 is displayed on the display unit 51 of the glasses type display device 5. In this case, the worker 9 can perceive the boundary position of the operating range R and, in addition, can perceive that he/she is present at a safe position that is relatively far away from the robot 2 based on the fact that only the frame is displayed, in other words, based on the fact that the details of the fence are not seen.

When the worker 9 approaches the robot 2 in this state with the result that the distance between the worker 9 and the robot 2 is reduced, the fence image generation unit 43 generates a fence image S21 having a frame and a lattice provided in the frame, as shown in FIG. 4(B). The fence image S21 is displayed on the display unit 51 of the glasses type display device 5. This presents the state in which the details of the fence are seen as the result of the worker 9 having approached the fence.

In this case, the worker 9 can perceive that he/she has approached the robot 2 based on the fact that the lattice is seen. In addition, as the fence having the lattice is explicitly seen and as the robot 2 is present in front of the fence, the worker 9 thinks that he/she will be in danger when the robot 2 is operated and it is considered that the worker should not approach that place. However, the lattice starts to be displayed when the worker 9 is spaced apart from the robot 2. In other words, the worker 9 is located at a safe position at the time at which the lattice is displayed.

When the worker 9 further approaches the robot 2 with the result that the distance between the worker 9 and the robot 2 is reduced, the fence image generation unit 43 generates a fence image S22 having a mode in which the display size of the fence image S21 is increased, as shown in FIG. 4(C). Furthermore, in FIG. 4(C), the color of the fence is schematically shown by hatching. The fence image S22 is displayed on the display unit 51 of the glasses type display device 5.

In this case, the worker 9 can perceive that he/she has approached the robot 2 based on the fact that the size of the fence is further increased. In addition, it is considered that approach to that place is prohibited or restricted based on the fact that the fence is displayed so as to appear large, and therefore it is considered that the worker should not mentally approach the robot 2.

When the worker 9 further approaches the robot 2 with the result that the distance between the worker 9 and the robot 2 is reduced right up to the operating range R, the fence image generation unit 43 generates a fence image S23 having a mode in which the display size of the fence image S23 is larger than that of the fence image S22, as shown in FIG. 4(D). The fence image S23 is displayed on the display unit 51 of the glasses type display device 5. In this case, the worker 9 determines that further advance is dangerous based on the fact that the fence is seen as if the fence were in front of his/her eyes, and considers that he/she should not approach the robot 2.

As described above, in the method based on active information presentation, the fence image displayed on the glasses type display device 5 is generated in a mode in which the display size of the fence image is increased depending on the distance to the robot 2 in order to obtain mental suppression effects to regulate approach to the operating range R. Consequently, it is possible to reduce a possibility of the worker 9 entering the operating range R even in the state in which no physical fence is present.

In addition, even in this method, in the case in which the worker 9 has entered the operating range R even though the fence images S20 to S23 are displayed, no fence image is generated or displayed. In other words, in the robot safety system 1, a virtual fence image is configured to be displayed with respect to the worker 9 located outside the operating range R of the robot 2 than the operating range R of the robot 2. In the case in which the worker 9 has entered the operating range R, however, the worker 9 is notified that the worker 9 has entered the operating range R, for example, by displaying an image in a corner of the visual field of the worker 9 at which the visual field of the worker 9 is not blocked or by flashing a message using a warning color, such as red. That is, a notification process of notifying the worker that the worker 9 has entered the operating range R is performed without displaying the fence image that may block the visual field of the worker. Furthermore, a voice output means for outputting a warning sound may be provided in the glasses type display device in order to notify the worker 9 that the worker 9 has entered the operating range R.

<Method Based on Active Background Presentation (Part 1)>

According to the method based on active information presentation described above, it is considered that it is possible to make the worker not advance further by actively presenting information about the robot 2. On the other hand, it is considered that it is also important for the worker to clearly visually recognize an object that may be dangerous, i.e. the robot 2 in this embodiment.

To this end, the fence image generation unit 43 generates a fence image having a mode in which the percentage of the fence image with respect to the visual field of the worker 9 is within a predetermined range irrespective of the distance to the robot 2. Specifically, in the case in which the fence images S22 and S23, illustrated in FIGS. 4(C) and 4(D), are generated, the fence image generation unit 43 generates the fence images S22 and S23 such that the areas of the fence images S22 and S23 are almost the same when they are displayed in the visual field.

Consequently, the size of the range in which the fence image is not displayed, i.e. the range in which the worker 9 can clearly visually recognize the robot 2 in the state in which the visual field of the worker 9 is not blocked by the fence image or in which it is not hard to see the robot 2, is almost uniform irrespective of the distance to the robot 2. In other words, it is possible to maintain the visual field of the worker 9 who approaches the robot 2 always uniform. Consequently, it is possible to improve safety during movement, As described above, in the method based on active background presentation (part 1), the fence image displayed on the glasses type display device 5 is generated in a mode in which the percentage of the fence image with respect to the visual field of the worker 9 is within a predetermined range irrespective of the distance to the robot 2 in order to obtain mental suppression effects to regulate approach to the operating range R. Consequently, it is possible to reduce a possibility of the worker 9 entering the operating range R even in the state in which no physical fence is present.

In addition, even in the case in which the worker 9 has entered the operating range R, it is possible to perform rapid response, since the visual field of the worker 9 is guaranteed. Of course, if the worker 9 has entered the operating range R, the fence image may not be displayed.

<Method Based on Active Background Presentation (part 2)>

According to the method based on active information presentation described above, it is considered that it is possible to make the worker not advance further by actively presenting information about the robot 2. On the other hand, it is considered that it is also important for the worker to clearly visually recognize an object that may be dangerous, i.e. the robot 2 in this embodiment.

Figure 5:
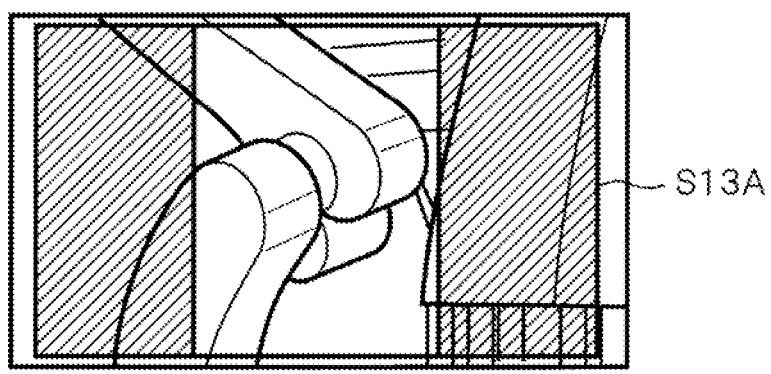
FIG. 5 is a view schematically showing an example of the display mode of a fence image (part 3)
Figure 6:
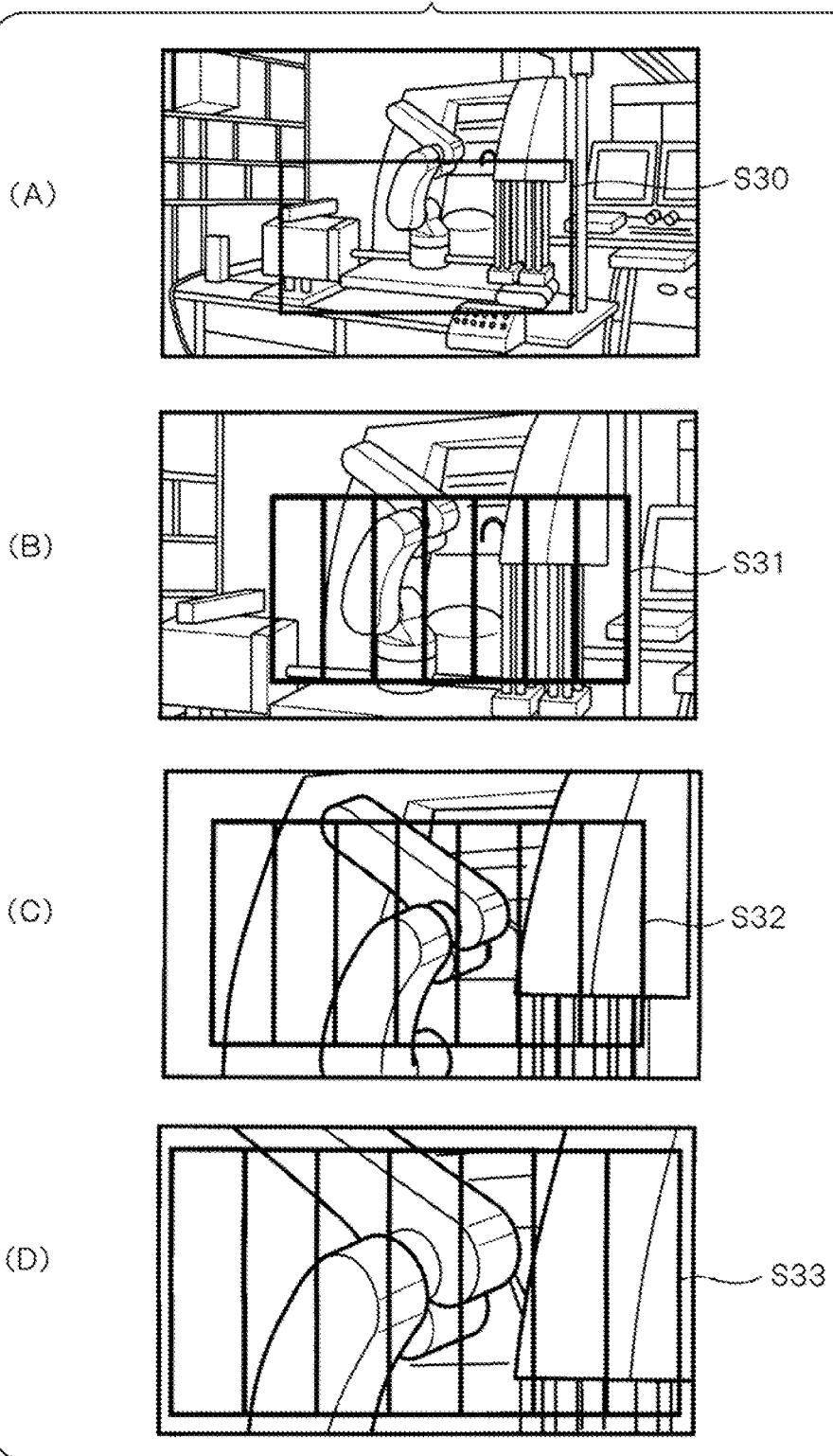
FIG. 6 is a view schematically showing an example of the display mode of a fence image (part 4)
Figure 7:
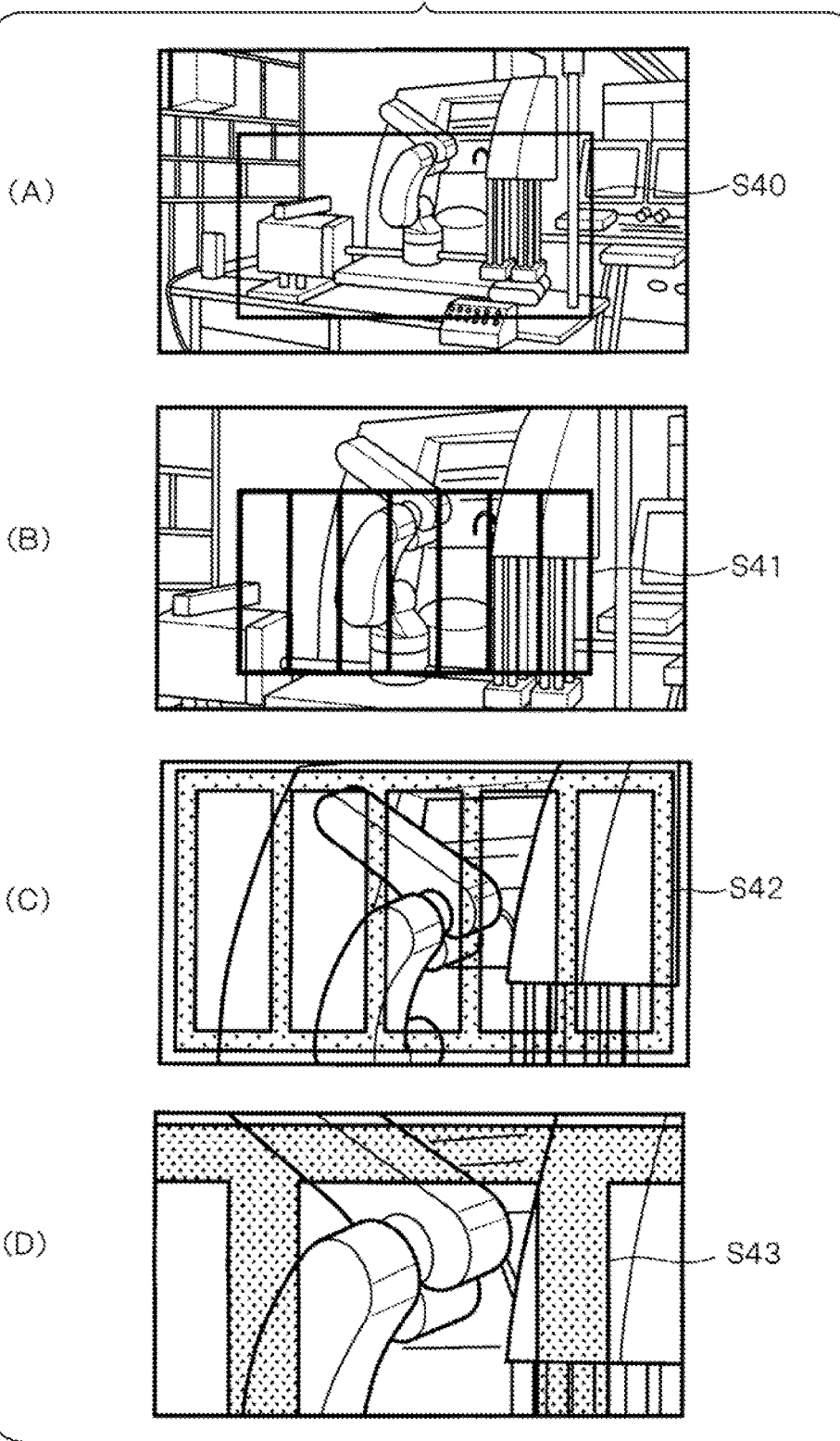
FIG. 7 is a view schematically showing an example of the display mode of a fence image (part 5)

To this end, the fence image generation unit 43 generates a fence image having a mode in which the fence image avoids a display regulation range that is preset on the basis of the center of the visual field of the worker 9. Specifically, as shown in FIG. 5, a display regulation range having a predetermined width and a predetermined height on the center of the visual field is set with respect to the fence image S13, illustrated in FIG. 3(D), and a fence image S13 A having a mode in which no image is displayed in the region is generated. Furthermore, the width and the height of the display regulation range may be appropriately set.

Consequently, the range including the center of the visual field of the worker 9, including a portion of the visual field that the worker 9 views the most, is clear in the state in which the visual field of the worker 9 is not blocked by the fence image or in which it is not hard to see the robot 2, whereby it is possible to always guarantee the visual field of the worker. Consequently, it is possible to improve safety during movement.

In addition, this method may be used in combination with the fence image S20 (see FIG. 4), illustrated in the above method based on active information presentation. In this case, a fence image having a mode in which the lattice of the fence deviates from the display regulation range may be generated.

As described above, in the method based on active background presentation (part 2), the fence image displayed on the glasses type display device 5 is generated in a mode in which the fence image avoids a display regulation range that is preset on the basis of the center of the visual field of the worker 9 in order to obtain mental suppression effects to regulate approach to the operating range R. Consequently, it is possible to reduce a possibility of the worker 9 entering the operating range R even in the state in which no physical fence is present. In addition, even in the case in which the worker 9 has entered the operating range R, it is possible for the worker 9 to perform rapid response, since the visual field of the worker 9 is guaranteed. Of course, if the worker 9 has entered the operating range R, the fence image may not be displayed.

<Method of Fixing Presented Information>

In the case in which more information is presented or a complicated information presentation method is used, the determination of information may not be possible, and therefore rapid response may not be possible. In addition, even in the case in which the shape or the like of information presented by an image is greatly changed, it is considered that the same possibility may occur.

In this method, therefore, the fence image generation unit 43 generates a fence image having a mode in which the display size of the fence image is increased as the distance to the robot 2 is reduced, which is an image of which the display mode is changed depending on the distance to the robot 2. Furthermore, the mode in which the display size of the fence image is increased in this method is a mode in which the shape of the fence image itself is uniform and the display size of the fence image is increased depending on the distance. More easily speaking, the above mode is a mode that presents information about whether the distance to the robot 2 is long or short based on the size of the image.

Specifically, in the case in which the distance to the robot 2 is relatively long, as shown in FIG. 6(A), the fence image generation unit 43 generates a fence image S30 having only a frame. At this time, the generated fence image S30 is displayed on the display unit 51 of the glasses type display device 5. In this case, the worker 9 can perceive the boundary position of the operating range R and, in addition, can perceive that he/she is present at a safe position that is relatively far away from the robot 2 based on the fact that only the frame is displayed, in other words, based on the fact that the details of the fence are not seen When the worker 9 approaches the robot 2 in this state with the result that the distance between the worker 9 and the robot 2 is reduced, the fence image generation unit 43 generates a fence image S31 having a frame and a lattice provided in the frame, as shown in FIG. 6(B). The fence image S31 is displayed on the display unit 51 of the glasses type display device 5. This presents the state in which the details of the fence are seen as the result of the worker 9 having approached the fence.

In this case, the worker 9 can perceive that he/she has approached the robot 2 based on the fact that the lattice is seen. In addition, as the lattice is explicitly seen and as the robot 2 is present in front of the lattice, the worker 9 thinks that he/she will be in danger when the robot 2 is operated and it is considered that the worker should not approach that place. However, it is possible for the worker 9 to easily perceive that the image is a fence for regulating the entry, since the shape of the image is not changed.

When the worker 9 further approaches the robot 2 with the result that the distance between the worker 9 and the robot 2 is reduced, the fence image generation unit 43 generates a fence image S32 having a mode in which the display size of the fence image S31 is increased, as shown in FIG. 6(C). At this time, only the size of the image is increased when the image is displayed in the state in which the shape of the image is not changed. The fence image S32 is displayed on the display unit 51 of the glasses type display device 5.

In this case, the worker 9 can perceive that he/she has approached the robot 2 based on the fact that the size of the fence is further increased. In addition, it is considered that approach to that place is prohibited or restricted based on the fact that the fence is displayed so as to appear large, and therefore it is considered that the worker should not mentally approach the robot 2.

When the worker 9 further approaches the robot 2 with the result that the distance between the worker 9 and the robot 2 is reduced right up to the operating range R, the fence image generation unit 43 generates a fence image S33 having a mode in which the display size of the fence image S33 is larger than that of the fence image S32 such that the fence image S33 is displayed over the majority of the visual field, as shown in FIG. 6(D). The fence image S33 is displayed on the display unit 51 of the glasses type display device 5. In this case, the worker 9 determines that further advance is dangerous based on the fact that the fence is seen as if the fence were in front of his/her eyes, and considers that he/she should not approach the robot 2.

As described above, in the method of fixing presented information, the fence image displayed on the glasses type display device 5 is generated in a mode in which the display size of the fence image is increased depending on the distance to the robot 2 in order to obtain mental suppression effects to regulate approach to the operating range R. Consequently, it is possible to reduce a possibility of the worker 9 entering the operating range R even in the state in which no physical fence is present.

In addition, even in this method, in the case in which the worker 9 has entered the operating range R, no fence image is generated or displayed.

<Method of Explicitly Changing Presented Information>

In daily life, danger may be classified and presented using colors. For example, at a traffic light, blue indicates the permission of entry, yellow indicates stop, and red indicates the prohibition of entry. If danger is classified and presented using colors, as described above, it is considered that the worker 9 can intuitively perceive danger with ease.

In this method, therefore, the fence image generation unit 43 generates a fence image having a mode in which the color of the fence image is changed depending on the distance to the robot 2, which is an image of which the display mode is changed depending on the distance to the robot 2.

In this embodiment, the fence image is generated such that the fence image is blue at the position at which the worker is far away from the robot 2, yellow when the worker is within a predetermined distance from the movable range K of the robot 2, and red when the worker is within the movable range K of the robot 2 and out of the operating range R of the robot 2. In addition, in this embodiment, a combination of this method and the above method based on active information presentation is adopted.

Specifically, in the case in which the distance to the robot 2 is relatively long, as shown in FIG. 7(A), the fence image generation unit 43 generates a fence image S40 having only a frame. At this time, the generated fence image S40 is displayed in blue on the display unit 51 of the glasses type display device 5.

When the worker 9 approaches the robot 2 in this state with the result that the distance between the worker 9 and the robot 2 is reduced, the fence image generation unit 43 generates a fence image S41 having a frame and a lattice provided in the frame, as shown in FIG. 7(B). In this case, since it is assumed that the worker is located at a safe position, as described above, at the time at which the lattice starts to be displayed, the fence image S41 is displayed in blue. However, it is possible for the worker 9 to perceive that he/she has approached the robot 2 based on the fact that the lattice is visible.

When the worker 9 further approaches the robot 2 with the result that the distance between the worker 9 and the robot 2 is reduced and thus the worker 8 enters a predetermined distance from the movable range K, the fence image generation unit 43 generates a fence image S42 having a mode in which the display size of the fence image S41 is increased and which is displayed in yellow, as shown in FIG. 7(C). The fence image S42 is displayed on the display unit 51 of the glasses type display device 5.

In this case, it is possible for the worker 9 to perceive that he/she has approached the movable range K of the robot, i.e. that the degree of danger becomes high, based on the fact that the size of the fence is further increased and that the image is displayed in yellow.

When the worker 9 further approaches the robot 2 with the result that the worker 9 enters the movable range K, the fence image generation unit 43 generates a fence image S43 having a mode in which the display size of fence image S43 is larger than that of the fence image S42 such that the fence image S43 is displayed in red over the majority of the visual field, as shown in FIG. 7(D). The fence image S43 is displayed on the display unit 51 of the glasses type display device 5. In this case, the worker 9 determines that further advance is dangerous based on the fact that the fence is seen as if the fence were in front of his/her eyes and that the image is displayed in red, and considers that he/she should not further approach the robot 2.

As described above, in the method of explicitly changing presented information, the fence image displayed on the glasses type display device 5 is generated in a mode in which the color of the fence image is changed depending on the distance to the robot 2 in order to obtain mental suppression effects to regulate approach to the operating range R. Consequently, it is possible for the worker 9 to intuitively danger and to reduce a possibility of the worker 9 entering the operating range R even in the state in which no physical fence is present.

In addition, even in this method, in the case in which the worker 9 has entered the operating range R, no fence image is generated or displayed. In addition, this method may be combined with the above method based on information interception.

Furthermore, this method may be combined with a method of changing the display mode of an image based on the movement locus of the worker 9. Specifically, in the case in which the worker 9 moves in the direction in which the worker 9 approaches the robot 2, a fence image having a mode in which the fence image is changed in stages from a display mode at the time at which the distance to the robot 2 is long to a display mode at the current position is generated based on the distance to the robot 2 at the time at which the robot 2 enters the visual field of the worker 9 and the movement locus of the worker 9 until the robot 2 enters the visual field of the worker 9. On the other hand, in the case in which the worker 9 moves in the direction in which the worker 9 is far away from the robot 2, a fence image having a mode in which the fence image is changed in stages from a display mode at the time at which the worker is near the robot 2 to a display mode at the current position is generated based on the distance to the robot 2 at the time at which the robot 2 enters the visual field of the worker 9 and the movement locus of the worker 9 until the robot 2 enters the visual field of the worker 9.

For example, in the case in which the position shown in FIG. 7(C) is the current position of the worker 9 and the worker 9 approaches the robot until the worker 9 reaches the position, it is possible to generate a fence image (a fence video) about 1 to 2 seconds long, in which the display mode is changed in stages from the mode of FIG. 7(A) to the mode of FIG. 7(C) for about 1 to 2 seconds. On the other hand, for example, in the case in which the position shown in FIG. 7(C) is the current position of the worker 9 and the worker 9 moves away from the robot until the worker 9 reaches the position, it is also possible to generate a fence image (a fence video) about 1 to 2 seconds long, in which the display mode is changed in stages from the mode of FIG. 7(D) to a mode of FIG. 7(C) for about 1 to 2 seconds.

Consequently, for example, in the case in which, when the worker 9 turns around in the state in which the worker 9 is near the robot 2 while facing a direction different from the direction that facing the robot 2, the robot 2 enters the visual field of the worker, with the result that a fence image is abruptly displayed, it is possible to easily perceive that the presented image is a fence image for regulating the entry into the moving range R and whether the worker moves toward the robot 2 or away from the robot 2. In the case in which the worker moves toward the robot 2, the worker can move in the direction in which the worker becomes distant from the robot 2 in order to avoid danger.

As described above, in the robot safety system 1, the fence image is displayed on the glasses type display device 5 using various methods, thereby reducing a possibility of entering the operating range R of the robot.

Figure 8:
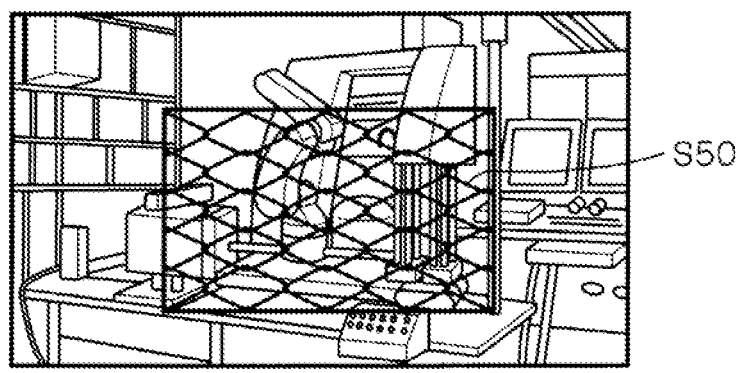
FIG. 8 is a view schematically showing another display example of a fence image.

Furthermore, each fence image is an example, and, for example, a wire mesh shaped fence image S50 shown in FIG. 8 may be generated.

According to the embodiment described above, it is possible to obtain the following effects.

The robot safety system includes a fence image generation unit 43 for generating a fence image, which is a virtual image indicating the boundary position of an operating range R of a robot 2 and of which a display mode is changed depending on the distance to the robot 2, and a glasses type display device 5 for displaying the generated fence image so as to overlap the visual field of a worker 9.

Consequently, it is possible for the worker 9 to perceive whether he/she is at a safe position or a dangerous position based on the presented image. In addition, it is possible to obtain mental suppression effects to avoid approach to that place since the fence-shaped image is displayed.

In the case in which the worker 9 works in a place in which no physical fence is provided, therefore, it is possible to reduce a possibility of the worker 9 entering the operating range R of the robot 2.

At this time, the fence image generation unit 43 generates a fence image having a mode in which transmittance is reduced as the distance to the robot 2 is reduced. Consequently, the worker 9 hesitates to go in that direction, i.e. toward the robot 2, as the worker 9 cannot see what is ahead or it is hard for the worker 9 to see what is ahead, and it is possible to reduce a possibility of the worker 9 entering the operating range R of the robot 2.

In addition, the fence image generation unit 43 generates a fence image having a mode in which the display size of the fence image is increased as the distance to the robot 2 is reduced. Consequently, the worker 9 does not move in that direction, i.e. toward the robot 2, because the fence-shaped image is displayed to clearly discourage the entry, whereby it is possible to reduce a possibility of the worker 9 entering the operating range R of the robot 2.

In addition, the fence image generation unit 43 generates a fence image having a mode in which the color of the fence image is changed depending on the distance to the robot 2. In this case, as the worker approaches the robot 2, the color is changed from a color having a low warning degree to a color having a high warning degree, e.g. from blue to yellow or from yellow to red. Consequently, the worker 9 does not move in that direction, i.e. toward the robot 2, whereby it is possible to reduce a possibility of the worker 9 entering the operating range R of the robot 2.

In addition, the fence image generation unit 43 generates a fence image having a mode in which the percentage of the fence image with respect to the visual field of the worker 9 is within a predetermined range irrespective of the distance to the robot 2. Even in the case in which the entry into the operating range R of the robot is restrained by displaying the fence image, if the visual field of the worker 9 is blocked by the displayed fence image, the worker may be rather in danger. For this reason, the fence image is generated such that the percentage of the fence image with respect to the visual field of the worker 9 is uniform, i.e. a fixed amount of the visual field of the worker 9 is secured, to improve safety during movement.

In addition, the fence image generation unit 43 generates a fence image having a mode in which the fence image avoids a display regulation range that is preset on the basis of the center of the visual field of the worker 9. Consequently, it is possible to secure a fixed amount of the visual field of the worker 9, whereby it is possible to improve safety during movement.

In addition, the fence image generation unit 43 generates a fence image having a mode in which the fence image is changed in stages based on the movement locus of the worker 9 until the robot 2 enters the visual field of the worker at the time at which the robot 2 enters the visual field of the worker 9. Consequently, in the case in which, when the worker 9 turns around with the result that a fence image is abruptly displayed, it is possible to avoid the situation in which the meaning of the fence image cannot be determined.

The present invention is not limited to the embodiment described above and shown in the drawings, and can be variously modified and extended within the gist of the invention.

The position information acquisition unit 53 may specify the position through image processing using, for example, a monitoring camera installed in a factory. In addition, the position information acquisition unit 53 may not be provided in the glasses type display device 5. For example, a laser sensor for detecting people or a motion sensor may be provided on the side of the robot 2. The position may be specified based on the detection result of the sensor, the position may be specified based on the detection result of the sensor and an image captured by the imaging unit 52, or the position relative to the robot 2 may be specified based on an image captured by the imaging unit 52.

Although a fence image is generated based on the positional relationship between the worker and the robot 2 in this embodiment, the robot 2 may be specified based on an image captured by the imaging unit 52, and a fence image indicating the operating range R of the robot 2 may be generated. Consequently, it is possible to display a fence image in a state exactly corresponding to the state in which the worker is actually looking at.

The processing shown in this embodiment may be performed by the robot controller 3 and the glasses type display device 5 in a distributed manner. For example, the specification unit, the position information acquisition unit, and the visual field information acquisition unit may be provided in the robot controller 3, and the fence image generation may be provided in the glasses type display device 5. In this case, the specification and installation position of the robot 2 are acquired from the safety controller 4, whereby the robot controller 3 and the glasses type display device 5 can specify the position and the visual field and can generate a fence image.

In addition, the safety controller 4 is not essential. In other embodiments, the processing performed by the safety controller 4 may be performed by the robot controller 3, and therefore the robot safety system 1 may be constituted by the robot controller 3 and the glasses type display device 5.

(Second Embodiment)

Hereinafter, a second embodiment will be described with reference to FIGS. 9 to 14.

Figure 9:
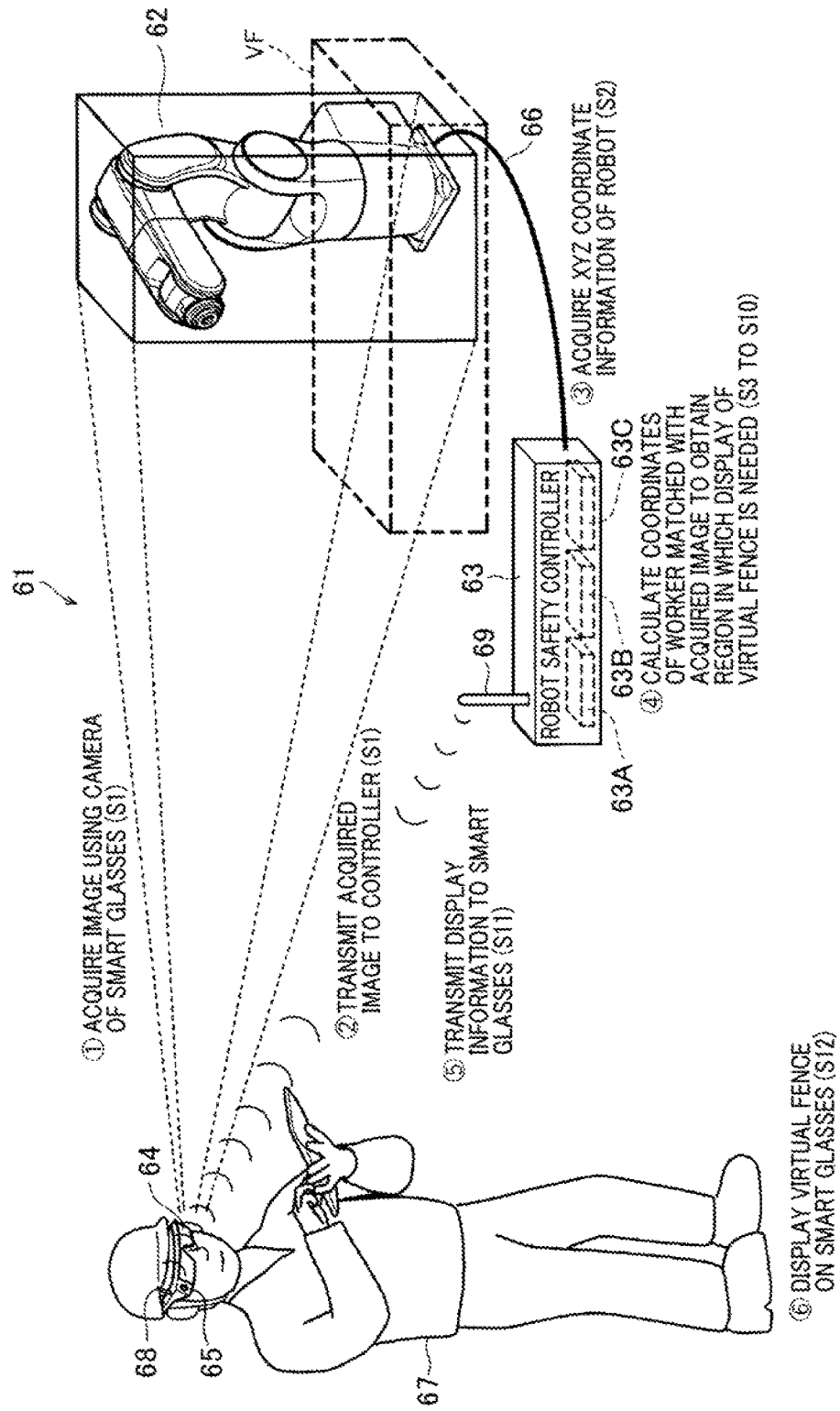
FIG. 9 is a view schematically showing the construction of a virtual fence display system that functions as a robot safety system according to a second embodiment.

As shown in FIG. 9, in this embodiment, a virtual fence display system 61 is provided as a robot safety system, such as an industrial robot safety system. The virtual fence display system 61 includes a robot arm 62 for assembly (or simply referred to as a robot main body or a robot), which is an example of an industrial robot, a robot safety controller 63, smart glasses 64, and a camera 65. The smart glasses 64 is a wearable device used for a worker by being worn on the worker's head and is refereed to as smart glasses or a glasses type display device.

The robot arm 62, which is the robot main body, may be, for example, a 6-axis vertical articulated robot. Although a detailed description of the general structure of the robot arm 62 will be omitted, the robot arm 62 has six axis arms that are driven by servo motors, and a hand for holding a workpiece received in, for example, a pallet is provided at the tip of the sixth axis arm.

The robot arm 62 is connected to the robot safety controller 3, which also has a function as a robot controller (that is, having dual functions), via a cable 66, and the servo motors of the axes of the robot arm 62 are controlled by the robot safety controller 63.

This robot safety controller 63 is provided as a computer which includes a CPU (central processing unit) 63A executing operation algorisms, a ROM(read-only memory) 63B, and a RAM(random access memory) 63C and is configured to be communicable with external systems. When being activated, the CPU 63A reads from the ROM 63B control programs and processing programs and temporarily stores such programs in the work area, and executes steps of such programs sequentially. In this embodiment, the ROM 63B functions as a non-transient computer readable recording medium. The RAM 63C is used as a temporary storage for data generated during execution of the programs of the CPU 63A. Hence, the CPU 63A is able to read previous-stored given programs from the ROM 63B for execution thereof, the various functions for controlling the robot and processing images can be provided.

The robot safety controller 63, which corresponds to an image processing unit (i.e., which functions as an image processing unit), acquires information about three-dimensional position coordinates (x, y, z) of the robot arm 62, which are stored in advance. In addition, the robot safety controller 63 stores data obtained by three-dimensionally s modeling the shape of a virtual fence VF, which is a safety fence virtually disposed around the robot arm 62, in a memory provided therein as 3D model image data.

Figure 10:
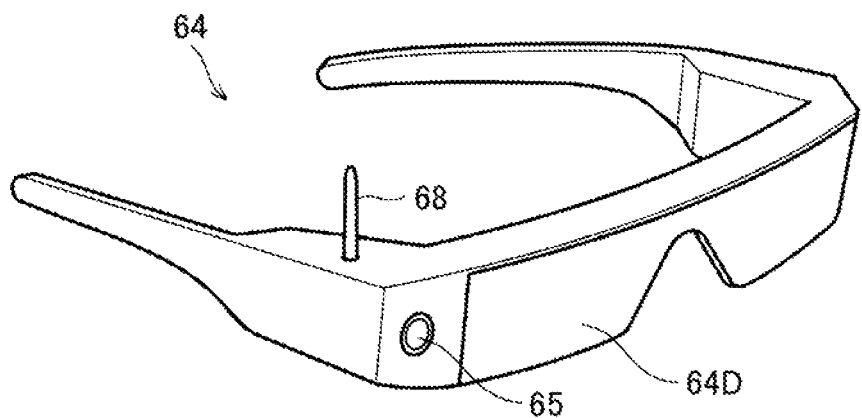
FIG. 10 is a perspective view showing the construction of smart glasses.

The smart glasses 64, which are a head mount type display device, are mounted to the head of a worker 67 in the manner in which glasses are worn. Consequently, the smart glasses 64 are a so-called transmission type display device configured such that an image is projected on a transparent display unit 4D, which corresponds to lenses of the glasses, via a projection unit (not shown). As shown in FIG. 10, a camera 65, which is a position and direction information output unit and an imaging device, is provided at one side of the frame of the smart glasses 64. The camera 65 captures an image in the direction that the front of the head of the worker 67 faces in the state in which the worker 67 has the smart glasses 64 on the head. The camera 65 is constituted by, for example, a CCD (Charge Coupled Device) or CMOS image sensor.

In FIGS. 9 and 10, a wireless communication unit 68, which is indicated by a symbol of an antenna, is mounted in the frame of the smart glasses 64. The wireless communication unit 68 is configured to communicate with a wireless communication unit 69 of the robot safety controller 63, which is also indicated by a symbol of an antenna in FIG. 9. The wireless communication unit 68 transmits data of an image captured by the camera 65 to the robot safety controller 63. The wireless communication unit 69 transmits the 3D model image data, which are stored in the robot safety controller 63, to the smart glasses 64. The communication units 68 and 69 correspond to first and second communication units, respectively.

Figure 11:
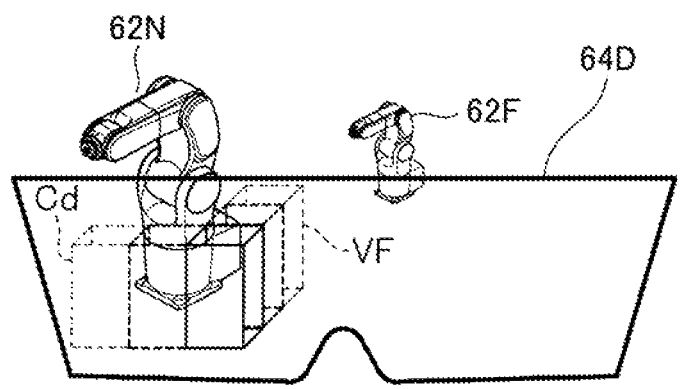
FIG. 11 is a view showing an example of a field of view that a worker wearing smart glasses views through a display unit.
Figure 13:
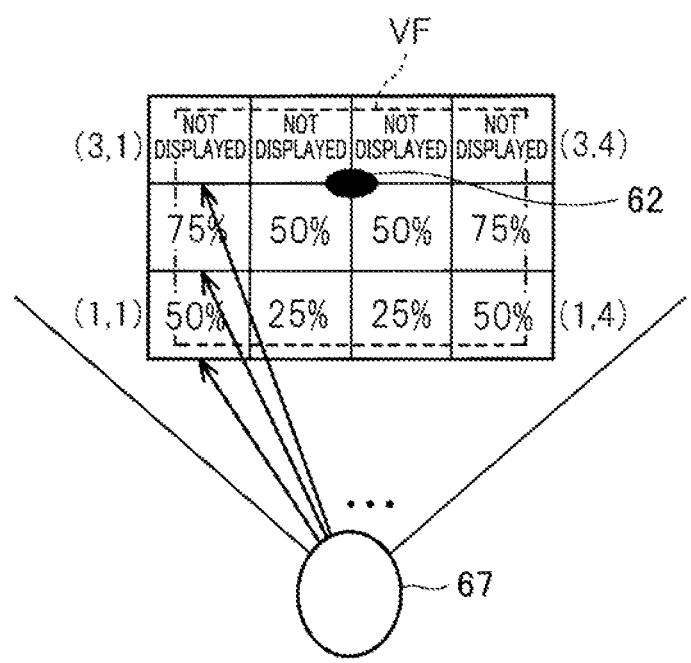
FIG. 13 is a view two-dimensionally showing an example of setting the transmittance of each rectangular parallelepiped.

As shown in FIGS. 11, 13, and 14, the 3D model image data of the virtual fence VF are modeled in the state in which the entirety of the virtual fence VF is divided into a plurality of rectangular parallelepipeds Cd. Each of the rectangular parallelepipeds Cd may be image-processed so as to be displayed at individually different transmittances.

FIG. 11 shows the state of the visual field that the worker 67 wearing the smart glasses 64 sees through the display unit 64D. In regard to a robot arm 62N, which is located in the vicinity of the worker 67, a 3D model image of the virtual fence VF is displayed. However, the entirety of the virtual fence VF is not displayed. The rectangular parallelepiped Cd of the portion of the virtual fence VF that is relatively close to the worker 67 is drawn in the state in which the transmittance thereof is relatively low. The rectangular parallelepiped Cd of the portion of the virtual fence VF that is relatively distant from the worker 67 is drawn in the state in which the transmittance thereof is relatively high. In regard to a robot arm 62F, which is located at a place distant from the worker 67, a 3D model image of the virtual fence VF is not displayed, since the safety of the worker 67 is not affected at the time at which the workers 67 works. That is, the transmittance of all of the rectangular parallelepipeds Cd is 100%. In the above description, the term "distant place" means a place that is further away than, for example, a work region of the robot arm 62.

Figure 12:
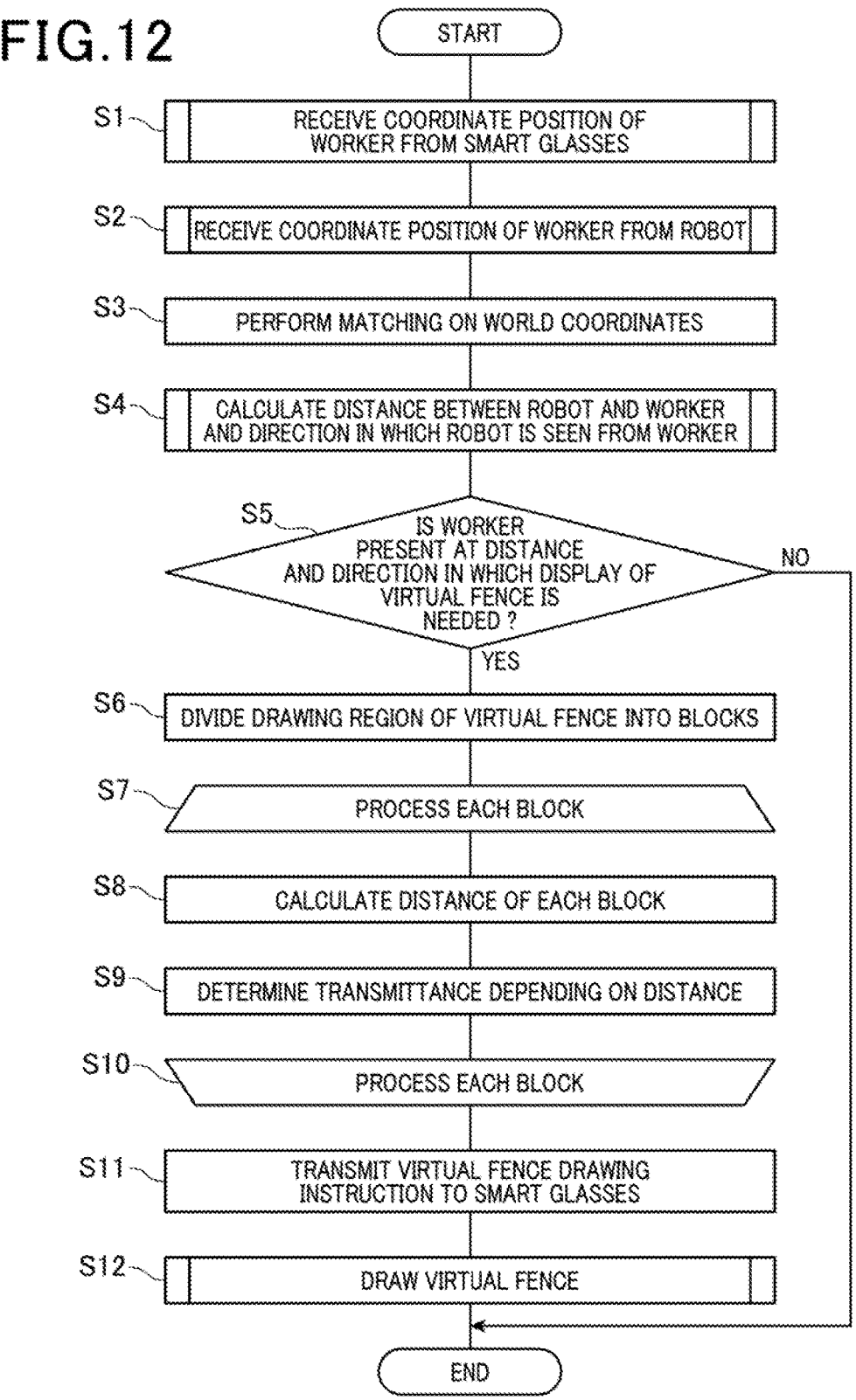
FIG. 12 is a flowchart showing processing based on a robot safety controller.

Next, the operation of this embodiment, which is configured to display an image on the smart glasses 64 as described above, will be described with reference to FIGS. 12 to 14. FIG. 12 is a flowchart showing processing based on the robot safety controller 63. First, the robot safety controller 63 acquires a coordinate position of the worker 67 from the smart glasses 64 (S1). Specifically, the smart glasses 64 transmit data of an image captured by the camera 65 to the robot safety controller 63. In the case in which the robot arm 62 is included in the image data, the robot safety controller 63 specifies a relative coordinate position of the worker 67 from the three-dimensional shape of the robot arm 62.

Subsequently, a coordinate position of the robot arm 62 is acquired (S2), and the position of the robot arm 62 and the position of the worker 67 are matched on world coordinates to specify the positional relationship therebetween (S3). Subsequently, the distance between the robot arm 62 and the worker 67 and the direction in which the robot arm 62 is seen from the viewpoint of the worker 67 are calculated (S4).

Subsequently, at step S5, it is determined whether the calculated distance and direction are within a range in which a virtual fence VF is required to be displayed on the smart glasses 64. In the case in which the calculated distance and direction are not within the range (NO), the processing is terminated. In the case in which the calculated distance and direction are within the range (YES), a drawing region of the virtual fence VF is divided into a plurality of blocks, i.e. rectangular parallelepipeds Cd (S6).

In a loop of subsequent steps S7 to S10, each of the rectangular parallelepipeds Cd is processed. When the distance from the position of the worker 67 to each of the rectangular parallelepipeds Cd is calculated (S8), the transmittance of each of the rectangular parallelepipeds Cd is determined depending on the calculated distance (S9). When all of the rectangular parallelepipeds Cd are processed, the robot safety controller 63 transmits 3D model image data of the virtual fence VF and a drawing instruction therefore to the smart glasses 64 (S11). Upon receiving them, the smart glasses 64 draw and display a 3D image of the virtual fence VF on the display unit 64D (S12).

A concrete example of setting of transmittance through the above processing is shown in a plan view of FIG. 13. It is assumed that the worker 67 is located at the center of the virtual fence VF in front of the robot arm 62 and is within a predetermined distance range in which the virtual fence VF is displayed. The virtual fence VF is two-dimensionally divided into 12 rectangular parallelepipeds Cd (3×4). At this time, if the transmittance of rectangular parallelepipeds Cd (1, 2) and (1, 3), which are located at the middle of the first column, which is closest to the worker 67, is, for example, 25%, the transmittance of rectangular parallelepipeds Cd (1, 1) and (1, 4), which are located outside the rectangular parallelepipeds Cd (1, 2) and (1, 3), shall be, for example, 50%.

If the transmittance of rectangular parallelepipeds Cd (2, 2) and (2, 3), which are located at the middle of the second column, is, for example, 50%, the transmittance of rectangular parallelepipeds Cd (2, 1) and (2, 4), which are located outside the rectangular parallelepipeds Cd (2, 2) and (2, 3), shall be, for example, 75%. The transmittance of rectangular parallelepipeds Cd (3, 1) to (3, 4) of the third column located at the rear of the robot arm is 100%, and the rectangular parallelepipeds Cd (3, 1) to (3, 4) are not displayed.

Figure 4:
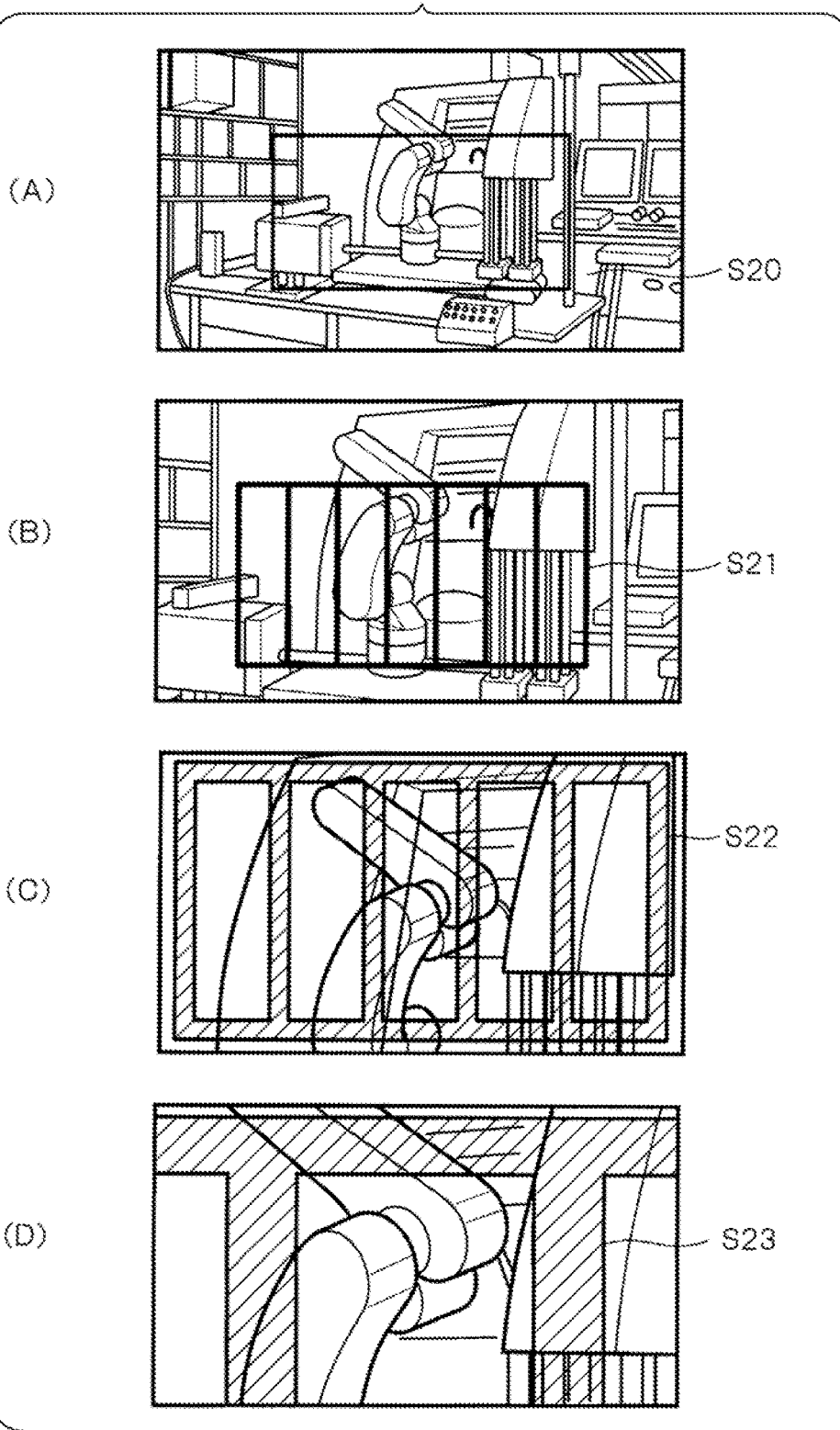
FIG. 4 is a view schematically showing an example of the display mode of a fence image (part 2)

In addition, the virtual fence VF is three-dimensionally displayed in FIG. 4. In this case, the virtual fence VF is divided into 9 portions in two dimensions (3×3). If being further divided into two in the height direction, the virtual fence VF is divided into 18 portions in three dimensions. In the case in which the worker 67 is located at the middle of the virtual fence VF, as shown in FIG. 14(c), the transmittance of rectangular parallelepipeds Cd (1, 1, 1) to (1, 3, 1), which are located at the lower part of the first column, is 25%. The transmittance of the rectangular parallelepipeds is as follows.

|  | Transmittance |
| --- | --- |
| Upper part of third column: (3, 1, 2) to (3, 3, 2) | 100% |
| Upper part of second column: (2, 1, 2) to (2, 3, 2) | 75% |
| Upper part of first column: (1, 1, 2) to (1, 3, 2) | 50% |
| Lower part of third column: (3, 1, 1) to (3, 3, 1) | 100% |
| Lower part of second column: (2, 1, 1) to (2, 3, 1) | 50% |
| Lower part of first column: (1, 1, 1) to (1, 3, 1) | 25% |

In the case in which the worker 67 is located at the left side of the virtual fence VF, as shown in FIG. 14(b), the transmittance of the rectangular parallelepipeds is as follows.

|  | Transmittance |
| --- | --- |
| Upper part of third column: (3, 1, 2) to (3, 3, 2) | 100%, 100%, 100% |
| Upper part of second column: (2, 1, 2) to (2, 3, 2) | 75%, 100%, 100% |
| Upper part of first column: (1, 1, 2) to (1, 3, 2) | 50%, 75%, 100% |
| Lower part of third column: (3, 1, 1) to (3, 3, 1) | 75%, 100%, 100% |
| Lower part of second column: (2, 1, 1) to (2, 3, 1) | 50%, 75%, 100% |
| Lower part of first column: (1, 1, 1) to (1, 3, 1) | 25%, 50%, 75% |

In the case in which the worker 67 is located at the right side of the virtual fence VF, as shown in FIG. 14(d), the transmittance of the rectangular parallelepipeds is as follows.

|  | Transmittance |
| --- | --- |
| Upper part of third column: (3, 1, 2) to (3, 3, 2) | 100%, 100%, 100% |
| Upper part of second column: (2, 1, 2) to (2, 3, 2) | 100%, 100%, 75% |
| Upper part of first column: (1, 1, 2) to (1, 3, 2) | 100%, 75%, 50% |
| Lower part of third column: (3, 1, 1) to (3, 3, 1) | 100%, 100%, 75% |
| Lower part of second column: (2, 1, 1) to (2, 3, 1) | 100%, 75%, 50% |
| Lower part of first column: (1, 1, 1) to (1, 3, 1) | 75%, 50%, 25% |

In the case in which the transmittance of the rectangular parallelepipeds Cd is set as described above, the part of the virtual fence VF that is relatively close to the worker 67 enters the visual field of the worker 67, with the result that the worker 67 can easily recognize the virtual fence VF. In addition, the worker 67 can be further able to secure his/her safety while working, thanks to the presence of the virtual fence VF. On the other hand, the part of the virtual fence VF that is relatively far from the worker 67 does not enter the visual field of the worker 67, with the result that it is difficult for the worker 67 to recognize the virtual fence VF. Consequently, it is possible for the worker 67 to easily visually recognize the robot arm 62 and the actual view around the robot arm 62 without being obstructed by the virtual fence VF.

According to this embodiment described above, it is possible for the robot safety controller 63 to store 3D model image data of a virtual fence VF that is virtually disposed around the position of the robot arm 62, to divide the 3D model image data into a plurality of rectangular parallelepipeds Cd, and to display each of the rectangular parallelepipeds Cd as an image having predetermined transmittance.

Upon acquiring information about the position and direction of the worker 67 wearing the smart glasses 64, the robot safety controller 63 processes the 3D model image data of the virtual fence displayed on the display unit 4D such that the 3D model image data are projected on the visual field of the worker 67. In this case, the 3D model image data are processed depending on the relationship in position and direction between the virtual fence VF and the worker 67 such that the transmittance of those among the rectangular parallelepipeds Cd that are close to the worker 67 is low and the transmittance of those among the rectangular parallelepipeds Cd that are far from the worker 67 is high, and the processed 3D model image data are transmitted to the smart glasses 64. The smart glasses 64 project and display the received 3D model image data of the virtual fence on the display unit 64D.

Consequently, it is possible to secure the safety of the worker 67 by displaying the virtual fence VF even in the case in which an actual safety fence is not disposed around the robot arm 62 and to improve the work efficiency of the worker 67 in a region in which the worker 67 works with the robot. In addition, since the transmittance of portions of the virtual fence VF that are relatively far from the worker 67, at which the safety of the worker 67 is sufficiently secured, is high, it is possible to prevent the attention of the worker 67 from being distracted. Furthermore, since the worker 67 can easily visually recognize the robot arm 62 and the actual view around the robot arm 62, it is possible to improve work efficiency.

The robot safety controller 63 acquires information about the position and direction of the worker 67 from the image of the robot arm 62 included in the image data captured by the camera 65, which is disposed in the smart glasses 64. That is, it is easy to dispose the small-sized camera 65 at the smart glasses 64, and it is possible to perceive the direction and the size of the robot arm 62 that is extracted from the image data captured by the camera 65 through the visual field of the worker 67. Consequently, it is possible for the robot safety controller 63 to acquire information about the position and direction of the worker 67 by processing the image data, and therefore it is not necessary to use a separate sensor for acquiring the information.

In addition, the robot safety controller 63 changes the transmittance of the 3D model image data in stages. Here, the term "stages" means stages that are greater than the minimum resolution at least at the time at which the robot safety controller 63 changes the transmittance and at which the worker 67 can recognize change in transmittance. According to the above structure, it is possible to reduce the calculation amount of the robot safety controller 63 and to more clearly recognize the boundary at which the transmittance of the rectangular parallelepipeds Cd is changed with respect to the worker 67.

The present invention is not limited to the embodiment described above and shown in the drawings, and can be variously modified and extended as follows.

Specific values of the transmittance may be appropriately changed depending on individual design.

The rectangular parallelepipeds Cd may be cubes.

The robot main body is not limited to the robot arm 62. In addition, the robot main body may be, for example, a horizontal 4-axis robot arm, a self-traveling robot, or a human-type robot.

A laser sensor, an infrared sensor, a GPS sensor, a gyro sensor, or an acceleration sensor may be used as the position and direction information acquisition unit. In addition, a signal from the above sensor may be directly input to the robot safety controller 63.

DESCRIPTION OF REFERENCE NUMERALS

In the drawings, 1 indicates a robot safety system, 2 indicates a robot, 3 indicates a robot controller (a fence image generation unit 11, a position information acquisition unit, a visual field information acquisition unit, and a specification unit), 4 indicates a safety controller (a fence image generation unit, a position information acquisition unit, a visual field information acquisition unit, and a specification unit), 4A indicates a CPU, 4B indicates a ROM, 4C indicates a RAM, 5 indicates a glasses type display device (a head mount type display device, a fence image generation unit, a position information acquisition unit, a visual field information acquisition unit, and a specification unit), 41 indicates a specification unit, 42 indicates a distance acquisition unit, 43 indicates a fence image generation unit, 53 indicates a position information acquisition unit, and 54 indicates a visual field information acquisition unit.

In the drawings, 61 indicates a virtual fence display system (a robot safety system), 62 indicates a robot arm, 63 indicates a robot safety controller (image controlling unit), 63A indicates a CPU, 63B indicates a ROM, 63C indicates a RAM, 64 indicates smart glasses (a head mount type display device), 64D indicates a display unit, 65 indicates a camera, 67 indicates a worker, and 68 and 69 indicate wireless communication units.

What is claimed is:

1. A robot safety system comprising:
   a position information acquisition unit for acquiring position information capable of specifying a position of a worker;
   a visual field information acquisition unit for acquiring visual field information capable of specifying a visual field of the worker;
   a specification unit for specifying a robot that the worker is looking at based on the position of the worker acquired by the position information acquisition unit and/or the visual field of the worker acquired by the visual field information acquisition unit;
   a distance acquisition unit for acquiring a distance between the robot specified by the specification unit and the worker based on the position information acquired by the position information acquisition unit;
   a fence image generation unit for generating a fence image of which a display mode is changed depending on a distance to the robot, which is a virtual image showing a boundary position of an operating range of the robot, based on the distance acquired by the distance acquisition unit; and a head mount type display device mounted to a head of the worker for displaying the fence image generated by the fence image generation unit such that the fence image overlaps a visual field of the worker.

2. The robot safety system according to claim 1, wherein the fence image generation unit generates the fence image in a mode in which the transmittance of the fence image is reduced as the distance to the robot is reduced.

3. The robot safety system according to claim 2, wherein the fence image generation unit generates the fence image in a mode in which a display size of the fence image is increased as the distance to the robot is reduced.

4. The robot safety system according to claim 3, wherein the fence image generation unit generates the fence image in a mode in which a color of the fence image is changed depending on the distance to the robot.

5. The robot safety system according to claim 4, wherein the fence image generation unit generates the fence image in a mode in which a percentage of the fence image with respect to the visual field of the worker is within a predetermined range irrespective of the distance to the robot.

6. The robot safety system according to claim 5, wherein the fence image generation unit generates the fence image in a mode in which the fence image avoids a display regulation range that is preset on a basis of a center of the visual field of the worker.

7. The robot safety system according to claim 6, wherein, based on the distance to the robot at a time at which the robot enters the visual field of the worker and a movement locus of the worker until the robot enters the visual field of the worker, the fence image generation unit generates the fence image in a mode in which the fence image is changed in stages from a display mode at the time at which the distance to the robot is long to a display mode at a current position in a case in which the worker moves in a direction in which the worker approaches the robot, and generates the fence image in a mode in which the fence image is changed in stages from a display mode at the time at which the worker is near the robot to a display mode at the current position in a case in which the worker moves in a direction in which the worker becomes far away from the robot.

8. The robot safety system according to claim 2, wherein the fence image generation unit generates the fence image in a mode in which a color of the fence image is changed depending on the distance to the robot.

9. The robot safety system according to claim 2, wherein the fence image generation unit generates the fence image in a mode in which a percentage of the fence image with respect to the visual field of the worker is within a predetermined range irrespective of the distance to the robot.

10. The robot safety system according to claim 2, wherein the fence image generation unit generates the fence image in a mode in which the fence image avoids a display regulation range that is preset on a basis of a center of the visual field of the worker.

11. The robot safety system according to claim 2, wherein, based on the distance to the robot at a time at which the robot enters the visual field of the worker and a movement locus of the worker until the robot enters the visual field of the worker, the fence image generation unit generates the fence image in a mode in which the fence image is changed in stages from a display mode at the time at which the distance to the robot is long to a display mode at a current position in a case in which the worker moves in a direction in which the worker approaches the robot, and generates the fence image in a mode in which the fence image is changed in stages from a display mode at the time at which the worker is near the robot to a display mode at the current position in a case in which the worker moves in a direction in which the worker becomes far away from the robot.

12. The robot safety system according to claim 1, wherein the fence image generation unit generates the fence image in a mode in which a display size of the fence image is increased as the distance to the robot is reduced.

13. The robot safety system according to claim 1, wherein the fence image generation unit generates the fence image in a mode in which a color of the fence image is changed depending on the distance to the robot.

14. The robot safety system according to claim 1, wherein the fence image generation unit generates the fence image in a mode in which a percentage of the fence image with respect to the visual field of the worker is within a predetermined range irrespective of the distance to the robot.

15. The robot safety system according to claim 1, wherein the fence image generation unit generates the fence image in a mode in which the fence image avoids a display regulation range that is preset on a basis of a center of the visual field of the worker.

16. The robot safety system according to claim 1, wherein, based on the distance to the robot at a time at which the robot enters the visual field of the worker and a movement locus of the worker until the robot enters the visual field of the worker, the fence image generation unit generates the fence image in a mode in which the fence image is changed in stages from a display mode at the time at which the distance to the robot is long to a display mode at a current position in a case in which the worker moves in a direction in which the worker approaches the robot, and generates the fence image in a mode in which the fence image is changed in stages from a display mode at the time at which the worker is near the robot to a display mode at the current position in a case in which the worker moves in a direction in which the worker becomes far away from the robot.

* * * * *